(12) United States Patent
Zhu et al.

(10) Patent No.: US 11,647,561 B2
(45) Date of Patent: May 9, 2023

(54) NODE AND COMMUNICATION METHOD

(71) Applicant: HUAWEI TECHNOLOGIES CO., LTD., Guangdong (CN)

(72) Inventors: Yuanping Zhu, Shanghai (CN); Mingzeng Dai, Shenzhen (CN); Haibo Xu, Beijing (CN); Xiaoli Shi, Shanghai (CN); Rui Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/927,101

(22) Filed: Jul. 13, 2020

(65) Prior Publication Data
US 2020/0344843 A1    Oct. 29, 2020

Related U.S. Application Data

(63) Continuation of application No. PCT/CN2019/071479, filed on Jan. 11, 2019.

(30) Foreign Application Priority Data

Jan. 13, 2018 (CN) .......................... 201810032722.3

(51) Int. Cl.
*H04W 76/12* (2018.01)
*H04W 80/12* (2009.01)
(Continued)

(52) U.S. Cl.
CPC ............ *H04W 80/12* (2013.01); *H04W 76/11* (2018.02); *H04W 76/12* (2018.02); *H04W 76/27* (2018.02); *H04W 80/02* (2013.01)

(58) Field of Classification Search
CPC ..... H04W 80/12; H04W 76/12; H04W 76/11; H04W 76/27; H04W 80/02;
(Continued)

(56) References Cited

U.S. PATENT DOCUMENTS

2008/0285501 A1* 11/2008 Zhang ................. H04L 49/3009
                                                            370/315
2009/0175214 A1    7/2009 Sfar et al.
(Continued)

FOREIGN PATENT DOCUMENTS

CN     101877915 A  *  4/2009  ............ H04W 72/12
CN     101686520 A     3/2010
(Continued)

OTHER PUBLICATIONS

U.S. Appl. No. 62/615,078.*
(Continued)

*Primary Examiner* — Lakeram Jangbahadur
(74) *Attorney, Agent, or Firm* — Fish & Richardson P.C.

(57) ABSTRACT

This application discloses communications methods, apparatuses, and systems. In one implementation, a method includes: performing a function of a control-plane protocol layer, wherein the control-plane protocol layer comprises a first protocol layer of the network node corresponding to a first protocol layer of a relay node, the first protocol layer is on an interface between the network node and the relay node, and the network node is a donor base station or a centralized unit of a donor base station; and sending, from the first protocol layer of the network node, a first message to the first protocol layer of the relay node, wherein the first protocol layer of the network node and the first protocol layer of the relay node are F1 application protocol layers, and the first message is a F1AP message that comprises one or more of context management information of a terminal device served by the relay node or a radio resource control message of the terminal device.

3 Claims, 19 Drawing Sheets

(51) Int. Cl.
*H04W 76/11* (2018.01)
*H04W 76/27* (2018.01)
*H04W 80/02* (2009.01)

(58) Field of Classification Search
CPC ... H04W 88/085; H04W 92/20; H04W 24/02; H04W 40/22; H04B 7/155; H04B 7/15507; H04B 7/26
See application file for complete search history.

(56) References Cited

U.S. PATENT DOCUMENTS

| | | | | |
|---|---|---|---|---|
| 2010/0260098 | A1* | 10/2010 | Ulupinar | H04L 12/4633 370/315 |
| 2011/0182244 | A1* | 7/2011 | Liang | H04W 8/082 370/328 |
| 2013/0039276 | A1 | 2/2013 | Tomoe | |
| 2016/0374138 | A1* | 12/2016 | Dai | H04W 76/15 |
| 2018/0124647 | A1* | 5/2018 | Dai | H04W 28/18 |
| 2019/0075023 | A1* | 3/2019 | Sirotkin | H04W 88/08 |
| 2020/0084618 | A1* | 3/2020 | Teyeb | H04W 76/11 |
| 2020/0382240 | A1* | 12/2020 | Centonza | H04W 76/12 |

FOREIGN PATENT DOCUMENTS

| | | |
|---|---|---|
| CN | 101877915 A | 11/2010 |
| CN | 102195704 A | 9/2011 |
| CN | 102457444 A | 5/2012 |
| CN | 102959527 A | 3/2013 |
| CN | 105103636 B | 11/2015 |
| CN | 105228171 A | 1/2016 |
| CN | 106162694 A | 11/2016 |
| CN | 106332048 A | 1/2017 |
| WO | 2007053950 A1 | 5/2007 |
| WO | 2010088804 A1 | 8/2010 |
| WO | 2017000863 A1 | 1/2017 |
| WO | 2017132069 A1 | 8/2017 |

OTHER PUBLICATIONS

Sirotkin, U.S. Appl. No. 62/582,839, filed Nov. 7, 2017.*
3GPP TR 21.905 V14.1.1 (Jun. 2017), 3rd Generation Partnership Project; Technical Specification Group Services and System Aspects; Vocabulary for 3GPP Specifications(Release 14), Jun. 2017, 65 pages.
3GPP TS 33.210 V14.0.0 (Dec. 2016), "3rd Generation Partnership Project; Technical Specification Group Services and System Aspects; 3G security; Network Domain Security (NDS); IP network layer security (Release 14)," Dec. 2016, 24 pages.
3GPP TS 33.501 V0.6.0 (Dec. 2017), "3rd Generation Partnership Project; Technical Specification Group Services and System Aspects; Security Architecture and Procedures for 5G System (Release 15)," Dec. 2017, 79 pages.
3GPP TS 38.300 V15.0 0 (Dec. 2017), "3rd Generation Partnership Project; Technical Specification Group Radio Access Network; NR; NR and NG-RAN Overall Description; Stage 2 (Release 15)," Dec. 2017, 68 pages.
3GPP TS 38.321 V15.0 0 (Dec. 2017), "3rd Generation Partnership Project; Technical Specification Group Radio Access Network; NR; Medium Access Control (MAC) protocol specification (Release 15)," Dec. 2017, 55 pages.
3GPP TS 38.401 V1.0.0 (Dec. 2017), "3rd Generation Partnership Project; Technical Specification Group Radio Access Network; NG-RAN; Architecture description (Release 15)," Dec. 2017, 22 pages.
3GPP TS 38.470 V1.0.0 (Dec. 2017), "3rd Generation Partnership Project; Technical Specification Group Radio Access Network; NG-RAN; F1 general aspects and principles (Release 15)," Dec. 2017, 11 pages.
3GPP TS 38.473 V1.0.0 (Dec. 2017), "3rd Generation Partnership Project; Technical Specification Group Radio Access Network; NG-RAN; F1 application protocol (F1AP) (Release 15)," Dec. 2017, 92 pages.
AT&T et al., "New SID Proposal: Study on Integrated Access and Backhaul for NR," 8881123GPP TSG RAN Meeting #75, RP-170821, Dubrovnik, Croatia, Mar. 6-9, 2017, 5 pages.
Ericsson, ST-Ericsson, "TP to internal TR on relay architecture options," 3GPP TSG-RAN WG2 #67, R2-095306, Shenzhen, China, Aug. 24-28, 2009, 17 pages.
Ericsson, "Architecture for integrated access and backhaul," 3GPP TSG-RAN WG2 NR AH1801, R2-1801022, Vancouver, Canada, Jan. 22-26, 2018, 9 pages.
Huawei et al., "Comparison of L2 and L3 relay architectures," 3GPP TSG-RAN WG2 Ad Hoc, R2-1801132, Vancouver, Canada, Jan. 22-26, 2018, 3 pages.
PCT International Search Report and Written Opinion issued in International Application No. PCT/CN2019/071479 dated Apr. 3, 2019, 17 pages (with English translation).
Office Action issued in Chinese Application No. 201810032722.3 dated Jan. 21, 2020, 24 pages (with English translation).
Extended European Search Report issued in European Application No. 19738480.3 dated Feb. 22, 2021, 6 pages.
Ericsson, "On the functional distribution over the F1 interface," 3GPP TSG RAN WG3 #96, R3-172023, Hangzhou, China, May 15-19, 2017, 4 pages.
Office Action issued in Korean Application No. 2020-7023116 dated Aug. 19, 2021, 6 pages (with English translation).
Office Action issued in Japanese Application No. 2020-538834 dated Sep. 27, 2021, 13 pages (with English translation).
OPPO, "Discussion on flexible routing support in IAB," 3GPP TSG RAN2 Meeting AH#1, R2-1800156, Vancouver, Canada, Jan. 22-26, 2018, 6 pages.

* cited by examiner

First node: donor base station, RN, or distributed unit of a donor base station

First node: centralized unit of a donor base station

A first node sends, at a first protocol layer, a first message to a peer first protocol layer on an interface between the first node and a second node /1901

The second node receives, at a first protocol layer, the first message from the peer first protocol layer on the interface between the second node and the first node /1902

NODE AND COMMUNICATION METHOD

CROSS-REFERENCE TO RELATED APPLICATIONS

This application is a continuation of International Application No. PCT/CN2019/071479, filed on Jan. 11, 2019, which claims priority to Chinese Patent Application No. 201810032722.3, filed on Jan. 13, 2018. The disclosures of the aforementioned applications are hereby incorporated by reference in their entireties.

TECHNICAL FIELD

This application relates to the field of communications technologies, and in particular, to a node and a communication method.

BACKGROUND

As technologies such as virtual reality (VR), augmented reality (AR), and the internet of things develop, there will be an increasing quantity of terminals in a future network, and usage of network data also continuously increases. To cope with the increasing quantity of terminals and extremely rapid growth of network data usage in a market, a higher requirement is currently posed on a capacity of a fifth-generation (5G) wireless communications system. In a hot-spot area, to meet a 5G ultra-high capacity requirement, using high-frequency small cells for networking becomes more popular. High-frequency carriers have a poor propagation characteristic, are severely attenuated by obstacles, and have small coverage. Therefore, a large quantity of small cells need to be densely deployed in the hotspot area. These small cells may be relay nodes (RN).

A relay technology is introduced into a long term evolution (LTE) release 10 (LTE R10) system, and a terminal may access a donor base station via an RN. In this case, the RN almost needs to have a capability the same as that of the donor base station. Consequently, implementation complexity and costs of the RN are relatively high.

SUMMARY

Embodiments of this application provide a node and a communication method, to resolve a problem of relatively high implementation complexity and costs of an RN.

To achieve the foregoing objective, the embodiments of this application provide the following technical solutions.

According to a first aspect, a first node is provided. The first node includes a control-plane protocol layer, where the control-plane protocol layer includes a peer first protocol layer with a second node on an interface between the first node and the second node, and the first node is an RN, a donor base station, a centralized unit of a donor base station, or a distributed unit of a donor base station, and the second node is an RN; and the first protocol layer in the first node is used to send a first message to a peer first protocol layer on the interface between the first node and the second node, where the first message includes context management information of a terminal served by the second node and/or an RRC message of the terminal. According to a method provided in the first aspect, the first node may configure, by using the first message, the context management information of the terminal served by the second node, and/or send the RRC message to the terminal via the second node, so that some functions originally performed by the second node are implemented by the first node. Therefore, implementation complexity and costs of the second node can be reduced.

In a possible design, if the first node is the donor base station, the RN, or the distributed unit of the donor base station, the control-plane protocol layer includes, from top to bottom, the peer first protocol layer, a peer RLC layer, a peer MAC layer, and a peer PHY layer with the second node on the interface between the first node and the second node; or if the first node is the centralized unit of the donor base station, the control-plane protocol layer includes, from top to bottom, the peer first protocol layer, a peer wiredly connected link layer, and a peer wiredly connected physical layer with the second node on the interface between the first node and the second node.

In a possible design, the control-plane protocol layer further includes a peer second protocol layer with the second node on the interface between the first node and the second node; and if the first node is the donor base station, the RN, or the distributed unit of the donor base station, the second protocol layer in the first node is located between the first protocol layer and the RLC layer in the first node; or if the first node is the centralized unit of the donor base station, the second protocol layer in the first node is located between the first protocol layer and the wiredly connected link layer in the first node.

In a possible design, the second protocol layer in the first node is used to perform at least one of the following processing on the first message: adding routing information for the first message, and adding a data packet type identifier for the first message; and the second protocol layer in the first node is further used to send, to a peer second protocol layer on the interface between the first node and the second node, the first message processed by the second protocol layer in the first node. The second protocol layer may add information such as routing information and a data packet type identifier for an F1AP message, and may further obtain information such as routing information and a data packet type identifier of the F1AP message, to ensure correct transmission of a data packet.

In a possible design, the second protocol layer in the first node is further used to determine an RB, a logical channel, an RLC channel, or an RLC bearer on which the first message processed by the second protocol layer in the first node is sent; and the second protocol layer in the first node is specifically used to send, to the peer second protocol layer on the interface between the first node and the second node on the determined RB, logical channel, RLC channel, or RLC bearer, the first message processed by the second protocol layer in the first node.

In a possible design, the first protocol layer in the first node is further used to receive a second message from the peer first protocol layer on the interface between the first node and the second node, where the second message includes at least one of the following information: management information of a first connection, the context management information of the terminal served by the second node, the RRC message of the terminal, a first identifier, and a second identifier; and the context management information that is of the terminal served by the second node and that is included in the second message includes a third identifier, the third identifier is a user-plane transmission channel identifier allocated by the second node to the terminal, the first identifier is a first connection identifier allocated by the first node to the terminal, the second identifier is a first connection identifier allocated by the second node to the terminal, and the first connection is a logical connection that is on the interface between the first node and the second node and that is based on the peer first protocol layer.

In a possible design, the first protocol layer in the first node is further used to send a third message to the peer first protocol layer on the interface between the first node and the second node, where the third message includes at least one of the following information: the management information of the first connection, the first identifier, and the second identifier; and the first identifier is the first connection identifier allocated by the first node to the terminal, the second identifier is the first connection identifier allocated by the second node to the terminal, and the first connection is the logical connection that is on the interface between the first node and the second node and that is based on the peer first protocol layer.

In a possible design, the context management information that is of the terminal served by the second node and that is included in the first message includes a fourth identifier, and the fourth identifier is a user-plane transmission channel identifier allocated by the first node to the terminal.

In a possible design, if the first node is the donor base station, the RN, or the distributed unit of the donor base station, the control-plane protocol layer includes, from top to bottom, the peer first protocol layer of the second node on the interface between the first node and the second node, and a peer RLC layer, a peer MAC layer, and a peer PHY layer with a third node on an interface between the first node and the third node; or if the first node is the centralized unit of the donor base station, the control-plane protocol layer includes, from top to bottom, the peer first protocol layer with the second node on the interface between the first node and the second node, and a peer wiredly connected link layer and a peer wiredly connected physical layer with a third node on an interface between the first node and the third node.

In a possible design, the control-plane protocol layer further includes a peer second protocol layer with the third node on the interface between the first node and the third node: and if the first node is the donor base station, the RN, or the distributed unit of the donor base station, the second protocol layer in the first node is located between the first protocol layer and the RLC layer in the first node; or if the first node is the centralized unit of the donor base station, the second protocol layer in the first node is located between the first protocol layer and the wiredly connected link layer in the first node.

In a possible design, the second protocol layer in the first node is used to perform at least one of the following processing on the first message: adding routing information for the first message, adding a data packet type identifier for the first message, and adding a bearer identifier of a first interface for the first message, where the first interface is a communications interface between the third node and the second node; and the second protocol layer in the first node is further used to send, to a peer second protocol layer on the interface between the first node and the third node, the first message processed by the second protocol layer in the first node.

In a possible design, the second protocol layer in the first node is further used to determine an RB, a logical channel, an RLC channel, or an RLC bearer on which the first message processed by the second protocol layer in the first node is sent; and the second protocol layer in the first node is specifically used to send, to the peer second protocol layer on the interface between the first node and the third node on the determined RB, logical channel, RLC channel, or RLC bearer, the first message processed by the second protocol layer in the first node.

According to a second aspect, a second node is provided. The second node includes a control-plane protocol layer, where the control-plane protocol layer includes a peer first protocol layer with a first node on an interface between the second node and the first node, and the first node is an RN, a donor base station, a centralized unit of a donor base station, or a distributed unit of a donor base station, and the second node is an RN; and the first protocol layer in the second node is used to receive a first message from a peer first protocol layer on the interface between the second node and the first node, where the first message includes context management information of a terminal served by the second node and/or an RRC message of the terminal. According to the method provided in the second aspect, the first node may configure, by using the first message, the context management information of the terminal served by the second node, and/or send the RRC message to the terminal via the second node, so that some functions originally performed by the second node are implemented by the first node. Therefore, implementation complexity and costs of the second node can be reduced.

In a possible design, if the first node is the donor base station, the RN, or the distributed unit of the donor base station, the control-plane protocol layer includes, from top to bottom, the peer first protocol layer, a peer RLC layer, a peer MAC layer, and a peer PHY layer with the first node on the interface between the second node and the first node; or if the first node is the centralized unit of the donor base station, the control-plane protocol layer includes, from top to bottom, the peer first protocol layer, a peer wiredly connected link layer, and a peer wiredly connected physical layer with the first node on the interface between the second node and the first node.

In a possible design, the control-plane protocol layer further includes a peer second protocol layer with the first node on the interface between the second node and the first node; and if the first node is the donor base station, the RN, or the distributed unit of the donor base station, the second protocol layer in the second node is located between the first protocol layer and the RLC layer in the second node: or if the first node is the centralized unit of the donor base station, the second protocol layer in the second node is located between the first protocol layer and the wiredly connected link layer in the second node. The second protocol layer may add information such as routing information and a data packet type identifier for an F1AP message, and may further obtain information such as routing information and a data packet type identifier of the F1AP message, to ensure correct transmission of a data packet.

In a possible design, the second protocol layer in the second node is used to receive, from a peer second protocol layer on the interface between the second node and the first node, the first message processed by the second protocol layer in the first node, where the second protocol layer in the first node performs at least one of the following processing on the first message: adding routing information for the first message, and adding a data packet type identifier for the first message: and the second protocol layer in the second node is further used to obtain at least one of the routing information of the first message and the data packet type identifier of the first message; and if the second protocol layer in the second node obtains the routing information of the first message, the second protocol layer in the second node is further used to route the first message based on the routing information of the first message; or if the second protocol layer in the second node determines that the second node is a destination node of the first message, the second protocol layer in the second node obtains the data packet type identifier of the first message, and the data packet type identifier of the first message indicates that the first message is a first protocol layer message, the second protocol layer in the second node is further used to send the first message to the first protocol layer in the second node.

In a possible design, the first protocol layer in the second node is further used to send a second message to the peer first protocol layer on the interface between the second node and the first node, where the second message includes at least one of the following information: management information of a first connection, the context management information of the terminal served by the second node, the RRC message of the terminal, a first identifier, and a second identifier; and the context management information that is of the terminal served by the second node and that is included in the second message includes a third identifier, the third identifier is a user-plane transmission channel identifier allocated by the second node to the terminal, the first identifier is a first connection identifier allocated by the first node to the terminal, the second identifier is a first connection identifier allocated by the second node to the terminal, and the first connection is a logical connection that is on the interface between the first node and the second node and that is based on the peer first protocol layer.

In a possible design, the first protocol layer in the second node is further used to receive a third message from the peer first protocol layer on the interface between the second node and the first node, where the third message includes at least one of the following information: the management information of the first connection, the first identifier, and the second identifier: and the first identifier is the first connection identifier allocated by the first node to the terminal, the second identifier is the first connection identifier allocated by the second node to the terminal, and the first connection is the logical connection that is on the interface between the first node and the second node and that is based on the peer first protocol layer.

In a possible design, the context management information that is of the terminal served by the second node and that is included in the first message includes a fourth identifier, and the fourth identifier is a user-plane transmission channel identifier allocated by the first node to the terminal.

In a possible design, if the first node is the donor base station, the RN, the distributed unit of the donor base station, or the centralized unit of the donor base station. the control-plane protocol layer includes, from top to bottom, the peer first protocol layer with the first node on the interface between the second node and the first node, and a peer RLC layer, a peer MAC layer, and a peer PHY layer with a third node on an interface between the second node and the third node; or if the first node is the centralized unit of the donor base station, the control-plane protocol layer includes, from top to bottom, the peer first protocol layer with the first node on the interface between the second node and the first node, and a peer wiredly connected link layer and a peer wiredly connected physical layer with the third node on the interface between the second node and the third node.

In a possible design, the control-plane protocol layer further includes a peer second protocol layer with the third node on the interface between the second node and the third node; and if the first node is the donor base station, the RN, the distributed unit of the donor base station, or the centralized unit of the donor base station, the second protocol layer in the second node is located between the first protocol layer and the RLC layer in the second node; or if the first node is the centralized unit of the donor base station, the second protocol layer in the second node is located between the first protocol layer and the wiredly connected link layer in the second node.

In a possible design, the second protocol layer in the second node is used to receive, from a peer second protocol layer on the interface between the second node and the third node, the first message processed by the second protocol layer in the third node, where the second protocol layer in the third node performs at least one of the following processing on the first message: adding routing information for the first message, and adding a data packet type identifier for the first message; and the second protocol layer in the second node is further used to obtain at least one of the routing information of the first message and the data packet type identifier of the first message; and if the second protocol layer in the second node obtains the routing information of the first message, the second protocol layer in the second node is further used to route the first message based on the routing information of the first message; or if the second protocol layer in the second node determines that the second node is a destination node of the first message, the second protocol layer in the second node obtains the data packet type identifier of the first message, and the data packet type identifier of the first message indicates that the first message is a first protocol layer message, the second protocol layer in the second node is further used to send the first message to the first protocol layer in the second node.

According to a third aspect, a third node is provided. The third node includes a control-plane protocol layer, where the control-plane protocol layer includes a peer second protocol layer, a peer RLC layer, a peer MAC layer, and a peer PHY layer with a first node on an interface between the third node and the first node; the control-plane protocol layer further includes a peer second protocol layer, a peer RLC layer, a peer MAC layer, and a peer PHY layer with a second node on an interface between the third node and the second node; the second protocol layer in the third node is used to receive, from a peer second protocol layer on the interface between the third node and the first node, a first message processed by the second protocol layer in the first node, and the second protocol layer in the first node performs at least one of the following processing on the first message: adding routing information for the first message, adding a data packet type identifier for the first message, and adding a bearer identifier of a first interface for the first message, where the first interface is a communications interface between the third node and the second node; the second protocol layer in the third node is further used to obtain at least one of the routing information of the first message, the bearer identifier of the first interface of the first message, and the data packet type identifier of the first message; the second protocol layer in the third node is further used to perform at least one of the following processing on the first message: adding the routing information for the first message and adding the data packet type identifier for the first message: and the second protocol layer in the third node is further used to send, to a peer second protocol layer on the interface between the third node and the second node, the first message processed by the second protocol layer in the third node. According to the method provided in the third aspect, the first node may configure, by using the first message, context management information of a terminal served by the second node, and/or send an RRC message to the terminal via the second node, so that some functions originally performed by the second node are implemented by the first node. Therefore, implementation complexity and costs of the second node can be reduced. The second protocol layer may add information such as routing information and a data packet type identifier for an F1AP message, and may further obtain information such as routing information and a data packet type identifier of the F1AP message, to ensure correct transmission of a data packet.

In a possible design, the second protocol layer in the third node obtains the routing information of the first message, and the second protocol layer in the third node is further used to route, based on the routing information of the first message, the first message processed by the second protocol layer in the third node; and/or the second protocol layer in the third node obtains the bearer identifier of the first interface, and the second protocol layer in the third node sends, based on the bearer identifier of the first interface on a bearer, a logical channel, an RLC channel, or an RLC bearer corresponding to the first interface, the first message processed by the second protocol layer in the third node.

The functions performed by the protocol layers may be implemented by hardware, or may be implemented by hardware by executing corresponding software. The hardware or the software includes one or more units corresponding to the foregoing functions. The first node, the second node, or the third node may exist in a product form of a chip.

According to a fourth aspect, a communication method is provided. The communication method is applied to a first node, where the first node includes a control-plane protocol layer, the control-plane protocol layer includes a peer first protocol layer with a second node on an interface between the first node and the second node, the first node is an RN, a donor base station, a centralized unit of a donor base station, or a distributed unit of a donor base station, the second node is an RN, and the method includes: sending, by the first node at the first protocol layer, a first message to a peer first protocol layer on the interface between the first node and the second node, where the first message includes context management information of a terminal served by the second node and/or an RRC message of the terminal. According to the method provided in the fourth aspect, the first node may configure, by using the first message, the context management information of the terminal served by the second node, and/or send the RRC message to the terminal via the second node, so that some functions originally performed by the second node are implemented by the first node. Therefore, implementation complexity and costs of the second node can be reduced.

In a possible design, the control-plane protocol layer further includes a peer second protocol layer with the second node on the interface between the first node and the second node; and if the first node is the donor base station, the RN, or the distributed unit of the donor base station, the control-plane protocol layer includes, from top to bottom, the peer first protocol layer, the peer second protocol layer, a peer RLC layer, a peer MAC layer, and a peer PHY layer with the second node on the interface between the first node and the second node; or if the first node is the centralized unit of the donor base station, the control-plane protocol layer includes, from top to bottom, the peer first protocol layer, the peer second protocol layer, a peer wiredly connected link layer, and a peer wiredly connected physical layer with the second node on the interface between the first node and the second node, and the method further includes: performing, by the first node at the second protocol layer, at least one of the following processing on the first message: adding routing information for the first message, and adding a data packet type identifier for the first message: and sending, by the first node at the second protocol layer to a peer second protocol layer on the interface between the first node and the second node, the first message processed by the first node at the second protocol layer. The second protocol layer may add information such as routing information and a data packet type identifier for an F1AP message, and may further obtain information such as routing information and a data packet type identifier of the F1AP message, to ensure correct transmission of a data packet.

In a possible design, before the sending, by the first node at the second protocol layer to a peer second protocol layer on the interface between the first node and the second node, the first message processed by the first node at the second protocol layer, the method further includes: determining, by the first node at the second protocol layer, an RB, a logical channel, an RLC channel, or an RLC bearer on which the first message processed by the first node at the second protocol layer is sent: and the sending, by the first node at the second protocol layer to a peer second protocol layer on the interface between the first node and the second node, the first message processed by the first node at the second protocol layer includes: sending, by the first node to the peer second protocol layer on the interface between the first node and the second node on the determined RB, logical channel, RLC channel, or RLC bearer at the second protocol layer, the first message processed by the first node at the second protocol layer.

In a possible design, the method further includes: receiving, by the first node at the first protocol layer, a second message from the peer first protocol layer on the interface between the first node and the second node, where the second message includes at least one of the following information: management information of a first connection, the context management information of the terminal served by the second node, the RRC message of the terminal, a first identifier, and a second identifier: and the context management information that is of the terminal served by the second node and that is included in the second message includes a third identifier, the third identifier is a user-plane transmission channel identifier allocated by the second node to the terminal, the first identifier is a first connection identifier allocated by the first node to the terminal, the second identifier is a first connection identifier allocated by the second node to the terminal, and the first connection is a logical connection that is on the interface between the first node and the second node and that is based on the peer first protocol layer.

In a possible design, the method further includes: sending, by the first node at the first protocol layer, a third message to the peer first protocol layer on the interface between the first node and the second node, where the third message includes at least one of the following information: the management information of the first connection, the first identifier, and the second identifier; and the first identifier is the first connection identifier allocated by the first node to the terminal, the second identifier is the first connection identifier allocated by the second node to the terminal, and the first connection is the logical connection that is on the interface between the first node and the second node and that is based on the peer first protocol layer.

In a possible design, the context management information that is of the terminal served by the second node and that is included in the first message includes a fourth identifier, and the fourth identifier is a user-plane transmission channel identifier allocated by the first node to the terminal.

In a possible design, the control-plane protocol layer further includes a peer second protocol layer with a third node on an interface between the first node and the third node; and if the first node is the donor base station, the RN, or the distributed unit of the donor base station, the control-plane protocol layer includes, from top to bottom, the peer first protocol layer with the second node on the interface between the first node and the second node, and the peer second protocol layer, a peer RLC layer, a peer MAC layer, and a peer PHY layer with the third node on the interface between the first node and the third node; or if the first node is the centralized unit of the donor base station, the control-plane protocol layer includes, from top to bottom, the peer first protocol layer with the second node on the interface between the first node and the second node, and the peer second protocol layer, a peer wiredly connected link layer, and a peer wiredly connected physical layer with the third node on the interface between the first node and the third node, and the method further includes: performing, by the first node at the second protocol layer, at least one of the following processing on the first message: adding routing information for the first message, adding a data packet type identifier for the first message, and adding a bearer identifier of a first interface for the first message, where the first interface is a communications interface between the third node and the second node; and sending, by the first node at the second protocol layer to a peer second protocol layer on the interface between the first node and the third node, the first message processed by the first node at the second protocol layer.

In a possible design, before the sending, by the first node at the second protocol layer to a peer second protocol layer on the interface between the first node and the third node, the first message processed by the first node at the second protocol layer, the method further includes: determining, by the first node at the second protocol layer, an RB, a logical channel, an RLC channel, or an RLC bearer on which the first message processed by the first node at the second protocol layer is sent; and the sending, by the first node at the second protocol layer to a peer second protocol layer on the interface between the first node and the third node, the first message processed by the first node at the second protocol layer includes: sending, by the first node to the peer second protocol layer on the interface between the first node and the third node on the determined RB, logical channel, RLC channel, or RLC bearer at the second protocol layer, the first message processed by the first node at the second protocol layer.

According to a fifth aspect, a communication method is provided. The communication method is applied to a second node, where the second node includes a control-plane protocol layer, the control-plane protocol layer includes a peer first protocol layer with a first node on an interface between the second node and the first node, the first node is an RN, a donor base station, a centralized unit of a donor base station, or a distributed unit of a donor base station, the second node is an RN, and the method includes: receiving, by the second node at the first protocol layer, a first message from a peer first protocol layer on the interface between the second node and the first node, and the first message includes context management information of a terminal served by the second node and/or an RRC message of the terminal. According to the method provided in the fifth aspect, the first node may configure, by using the first message, the context management information of the terminal served by the second node, and/or send the RRC message to the terminal via the second node, so that some functions originally performed by the second node are implemented by the first node. Therefore, implementation complexity and costs of the second node can be reduced.

In a possible design, the control-plane protocol layer further includes a peer second protocol layer with the first node on the interface between the second node and the first node; and if the first node is the donor base station, the RN, or the distributed unit of the donor base station, the control-plane protocol layer includes, from top to bottom, the peer first protocol layer, the peer second protocol layer, a peer RLC layer, a peer MAC layer, and a peer PHY layer with the first node on the interface between the second node and the first node; or if the first node is the centralized unit of the donor base station, the control-plane protocol layer includes, from top to bottom, the peer first protocol layer, the peer second protocol layer, a peer wiredly connected link layer, and a peer wiredly connected physical layer with the first node on the interface between the second node and the first node, and the method further includes: receiving, by the second node at the second protocol layer from a peer second protocol layer on the interface between the second node and the first node, the first message processed by the second protocol layer in the first node, where the second protocol layer in the first node performs at least one of the following processing on the first message: adding routing information for the first message, and adding a data packet type identifier for the first message; and obtaining, by the second node at the second protocol layer, at least one of the routing information of the first message and the data packet type identifier of the first message: and if the second node obtains the routing information of the first message at the second protocol layer, routing, by the second node at the second protocol layer, the first message based on the routing information of the first message; or if the second protocol layer in the second node determines that the second node is a destination node of the first message, the second node obtains the data packet type identifier of the first message at the second protocol layer, and the data packet type identifier of the first message indicates that the first message is a first protocol layer message, sending, by the second node at the second protocol layer, the first message to the first protocol layer in the second node. The second protocol layer may add information such as routing information and a data packet type identifier for an F1AP message, and may further obtain information such as routing information and a data packet type identifier of the F1AP message, to ensure correct transmission of a data packet.

In a possible design, the method further includes: sending, by the second node at the first protocol layer, a second message to the peer first protocol layer on the interface between the second node and the first node, where the second message includes at least one of the following information: management information of a first connection, the context management information of the terminal served by the second node, the RRC message of the terminal, a first identifier, and a second identifier; and the context management information that is of the terminal served by the second node and that is included in the second message includes a third identifier, the third identifier is a user-plane transmission channel identifier allocated by the second node to the terminal, the first identifier is a first connection identifier allocated by the first node to the terminal, the second identifier is a first connection identifier allocated by the second node to the terminal, and the first connection is a logical connection that is on the interface between the first node and the second node and that is based on the peer first protocol layer.

In a possible design, the method further includes: receiving, by the second node at the first protocol layer, a third message from the peer first protocol layer on the interface between the second node and the first node, where the third message includes at least one of the following information: the management information of the first connection, the first identifier, and the second identifier; and the first identifier is the first connection identifier allocated by the first node to the terminal, the second identifier is the first connection identifier allocated by the second node to the terminal, and the first connection is the logical connection that is on the interface between the first node and the second node and that is based on the peer first protocol layer.

In a possible design, the context management information that is of the terminal served by the second node and that is included in the first message includes a fourth identifier, and the fourth identifier is a user-plane transmission channel identifier allocated by the first node to the terminal.

In a possible design, the control-plane protocol layer further includes a peer second protocol layer with a third node on an interface between the second node and the third node; and if the first node is the donor base station, the RN, the distributed unit of the donor base station, or the centralized unit of the donor base station, the control-plane protocol layer includes, from top to bottom, the peer first protocol layer with the first node on the interface between the second node and the first node, and the peer second protocol layer, a peer RLC layer, a peer MAC layer, and a peer PHY layer with the third node on the interface between the second node and the third node; or if the first node is the centralized unit of the donor base station, the control-plane protocol layer includes, from top to bottom, the peer first protocol layer with the first node on the interface between the second node and the first node, and the peer second protocol layer, a peer wiredly connected link layer, and a peer wiredly connected physical layer with the third node on the interface between the second node and the third node, and the method further includes: receiving, by the second node at the second protocol layer from a peer second protocol layer on the interface between the second node and the third node, the first message processed by the second protocol layer in the third node, where the second protocol layer in the third node performs at least one of the following processing on the first message: adding routing information for the first message, and adding a data packet type identifier for the first message; and obtaining, by the second node at the second protocol layer, at least one of the routing information of the first message and the data packet type identifier of the first message; and if the second node obtains the routing information of the first message at the second protocol layer, routing, by the second node at the second protocol layer, the first message based on the routing information of the first message: or if the second protocol layer in the second node determines that the second node is a destination node of the first message, the second node obtains the data packet type identifier of the first message at the second protocol layer, and the data packet type identifier of the first message indicates that the first message is a first protocol layer message, sending, by the second node at the second protocol layer, the first message to the first protocol layer in the second node.

According to a sixth aspect, a communication method is provided. The communication method is applied to a third node, where the third node includes a control-plane protocol layer, the control-plane protocol layer includes a peer second protocol layer, a peer RLC layer, a peer MAC layer, and a peer PHY layer with a first node on an interface between the third node and the first node; the control-plane protocol layer further includes a peer second protocol layer, a peer RLC layer, a peer MAC layer, and a peer PHY layer with a second node on an interface between the third node and the second node: the method includes: receiving, by the third node at the second protocol layer from a peer second protocol layer on the interface between the third node and the first node, a first message processed by the second protocol layer in the first node, where the second protocol layer in the first node performs at least one of the following processing on the first message: adding routing information for the first message, adding a data packet type identifier for the first message, and adding a bearer identifier of a first interface for the first message, where the first interface is a communications interface between the third node and the second node; obtaining, by the third node at the second protocol layer, at least one of the routing information of the first message, the bearer identifier of the first interface of the first message, and the data packet type identifier of the first message; performing, by the third node at the second protocol layer, at least one of the following processing on the first message: adding the routing information for the first message and adding the data packet type identifier for the first message: and sending, by the third node at the second protocol layer to a peer second protocol layer on the interface between the third node and the second node, the first message processed by the second protocol layer in the third node. According to the method provided in the sixth aspect, the first node may configure, by using the first message, context management information of a terminal served by the second node, and/or send an RRC message to the terminal via the second node, so that some functions originally performed by the second node are implemented by the first node. Therefore, implementation complexity and costs of the second node can be reduced. The second protocol layer may add information such as routing information and a data packet type identifier for an F1AP message, and may further obtain information such as routing information and a data packet type identifier of the F1AP message, to ensure correct transmission of a data packet.

In a possible design, the third node obtains the routing information of the first message at the second protocol layer, and the third node routes, at the second protocol layer based on the routing information of the first message, the first message processed by the third node at the second protocol layer; and/or the third node obtains the bearer identifier of the first interface at the second protocol layer, and the third node sends, at the second protocol layer based on the bearer identifier of the first interface on a bearer, a logical channel, an RLC channel, or an RLC bearer corresponding to the first interface, the first message processed by the third node at the second protocol layer.

According to a seventh aspect, a first node is provided. The first node includes a memory and a processor, where the memory is configured to store a computer execution instruction, and the processor executes the computer execution instruction stored in the memory, so that the first node implements any method provided in the fourth aspect.

According to an eighth aspect, a second node is provided. The first node includes a memory and a processor, where the memory is configured to store a computer execution instruction, and the processor executes the computer execution instruction stored in the memory, so that the second node implements any method provided in the fifth aspect.

According to a ninth aspect, a third node is provided. The third node includes a memory and a processor, where the memory is configured to store a computer execution instruction, and the processor executes the computer execution instruction stored in the memory, so that the third node implements any method provided in the sixth aspect.

According to a tenth aspect, a computer-readable storage medium is provided. The computer-readable storage medium includes an instruction; when the instruction is run on a computer, the computer is enabled to perform any method provided in the fourth aspect, the fifth aspect, or the sixth aspect.

According to an eleventh aspect, a computer program product including an instruction is provided. When the computer program product is run on a computer, the computer is enabled to perform any method provided in the fourth aspect, the fifth aspect, or the sixth aspect.

For beneficial effects of any of the implementations of the seventh aspect to the eleventh aspect, refer to beneficial effects of corresponding implementations of the third aspect to the sixth aspect. Details are not described herein again.

DESCRIPTION OF EMBODIMENTS

The following describes technical solutions of embodiments in this application with reference to accompanying drawings in the embodiments of this application. In description of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of this application, "a plurality of" means two or more than two.

A method provided in the embodiments of this application may be applied to a wireless communications system, for example, a global system for mobile communications (GSM) system, a code division multiple access (CDMA) system, a wideband code division multiple access (WCDMA) system, a general packet radio service (GPRS) system, and a universal mobile telecommunications system (UMTS), and in particular, may be applied to an LTE system and an evolved system thereof, a long term evolution-advanced (LTE-A) system and an evolved system thereof, and a 5G wireless communications system.

A relay technology is introduced to LTE R10. To design a flexible and convenient access and backhaul solution, both an access link (AL) and a backhaul link (BL) in a relay networking scenario use a wireless transmission solution.

In a 5G-oriented wireless relay networking scenario, both multi-hop wireless relay and multi-connection wireless relay are supported. It should be noted that in a 5G communications system, an RN may also be referred to as an integrated access and backhaul (IAB) node. Therefore, when the method provided in the embodiments of this application is applied to a 5G communications system, all following RNs in the embodiments of this application may be replaced with IAB nodes.

Figure 1:
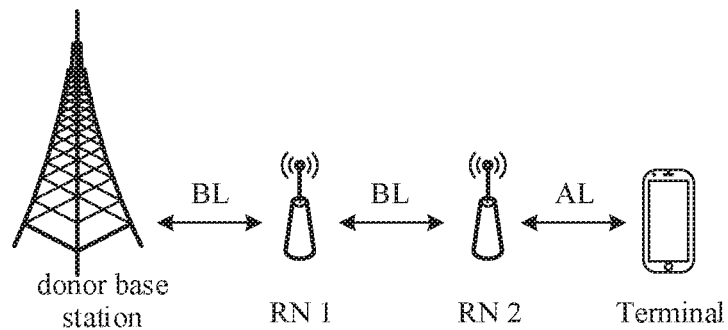
FIG. 1 and FIG. 2 each are a schematic diagram of an RN networking scenario according to an embodiment of this application.

Referring to FIG. 1, in a multi-hop wireless relay networking scenario, there is a clear hierarchical relationship between the RN and a donor base station (e.g. DgNB) serving the RN, and each RN considers a node that provides a backhaul service for the RN as a unique parent node. For example, a parent node of an RN 2 is an RN 1, and a parent node of the RN 1 is a donor base station. An uplink data packet of a terminal served by the RN 2 is transmitted to the donor base station through the RN 2 and the RN 1 in sequence, and is sent by the donor base station to a mobile gateway device (for example, a user plane function (UPF) network element in a 5G network). After receiving, from the mobile gateway device, a downlink data packet of the terminal served by the RN 2, the donor base station sends the downlink data packet to the terminal through the RN 1 and the RN 2 in sequence.

Figure 2:
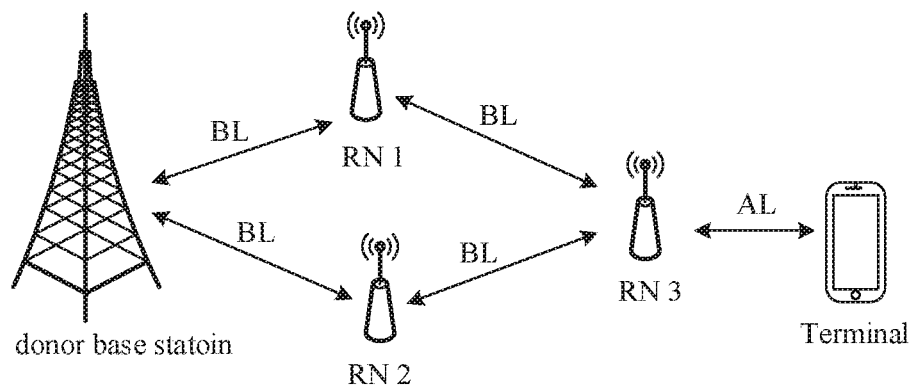

Referring to FIG. 2, in a multi-hop and multi-connection wireless relay networking scenario, an RN 3 has two parent nodes: an RN 1 and an RN 2, that is, the RN 3 has two BLs. Parent nodes of the RN 2 and the RN 1 are both a donor base station. An uplink data packet of a terminal served by the RN 3 may be transmitted to the donor base station through two transmission paths: the terminal-the RN 3-the RN 1-the donor base station and the terminal-the RN 3-the RN 2-the donor base station. A downlink data packet of the terminal served by the RN 3 may also be transmitted to the terminal through two transmission paths: the donor base station-the RN 1-the RN 3-the terminal and the donor base station-the RN 2-the RN 3-the terminal.

The foregoing wireless relay networking scenarios are merely examples. In a wireless relay networking scenario in which combination of a plurality of hops and a plurality of connections is considered, there are more other possibilities.

For example, two RNs separately connected to two donor base stations form a dual connection to serve a terminal. The possibilities are not listed one by one in the embodiments of this application.

Figure 3:
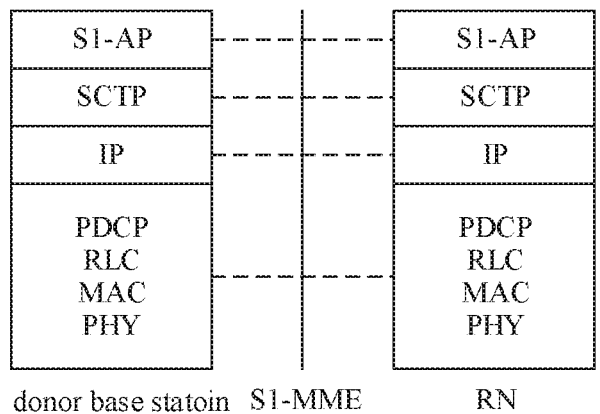
FIG. 3 is a schematic architectural diagram of a protocol layer according to an embodiment of this application.

In a relay networking scenario in an LTE system, for an architecture of a control-plane protocol layer (which may also be referred to as a "control-plane protocol stack") of an RN, refer to FIG. 3. The control-plane protocol layer of the RN includes a peer S1 application protocol (S1-AP) layer, a peer stream control transmission protocol (SCTP) layer, a peer internet protocol (IP) layer, a peer packet data convergence protocol (PDCP) layer, a peer radio link control (RLC) layer, a peer media access control (MAC) layer, and a peer physical (PHY) layer with a donor base station on an S1-MME (an MME is a mobility management network element (mobility management entity)) interface between the RN and the donor base station. It can be learned that the RN almost needs to have a capability the same as that of the donor base station.

Figure 4:
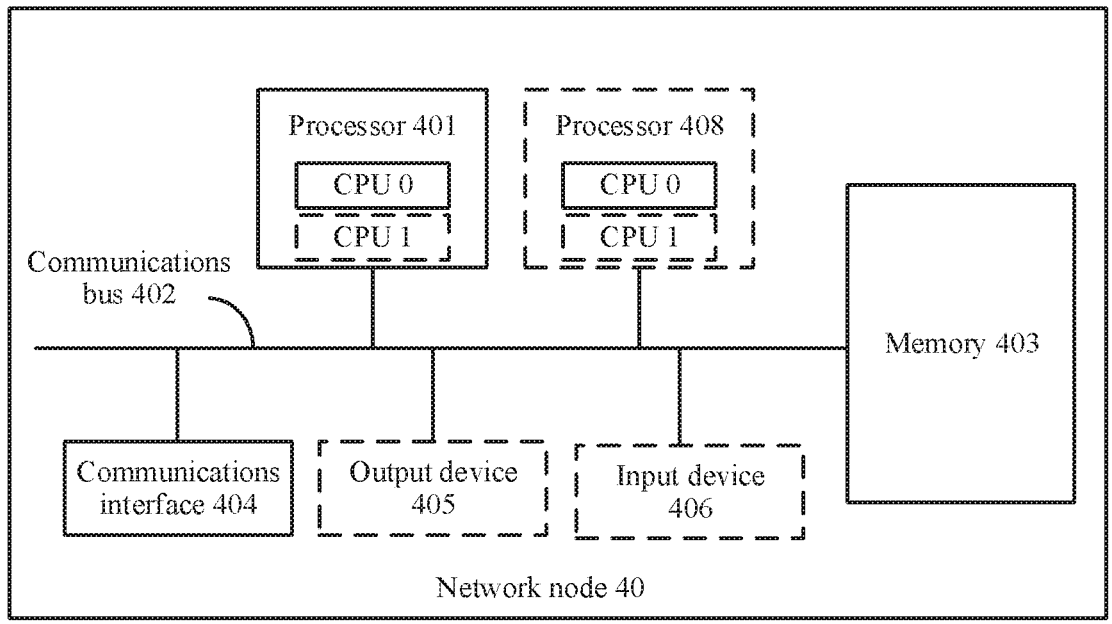
FIG. 4 is a schematic diagram of a hardware structure of a network node according to an embodiment of this application.

To reduce implementation complexity and costs of an RN, an embodiment of this application provides a first node and a second node. For schematic diagrams of hardware structures of the first node and the second node, refer to FIG. 4. FIG. 4 is a schematic diagram of a hardware structure of a network node 40. The network node 40 includes at least one processor 401, a communications bus 402, a memory 403, and at least one communications interface 404.

The processor 401 may be a general-purpose central processing unit (CPU), a microprocessor, an application-specific integrated circuit (ASIC), or one or more integrated circuits configured to control program execution in the solutions in this application.

The communications bus 402 may include a path used to transmit information between the foregoing components.

The communications interface 404 may be used by any apparatus such as a transceiver to communicate with another device or communications network such as the Ethernet, a radio access network (RAN), or a wireless local area network (WLAN).

The memory 403 may be a read-only memory (ROM) or another type of static storage device capable of storing static information and instructions, a random access memory (RAM) or another type of dynamic storage device capable of storing information and instructions, or may be an electrically erasable programmable read-only memory (EEPROM), a compact disc read-only memory (CD-ROM) or other compact disc storage or optical disc storage (including a compressed optical disc, a laser disc, an optical disc, a digital versatile disc, a blue-ray optical disc, and the like), a magnetic disk storage medium or another magnetic storage device, or any other medium capable of carrying or storing expected program code in a form of instructions or data structures and capable of being accessed by a computer, but is not limited thereto. The memory may exist independently, and is connected to the processor by using the bus. The memory may alternatively be integrated with the processor.

The memory 403 is configured to store application program code for performing the solutions in this application, and the application program code is executed under control of the processor 401. The processor 401 is configured to execute the application program code stored in the memory 403, to implement methods provided in the following embodiments of this application.

In a specific implementation, in an embodiment, the processor 401 may include one or more CPUs, for example, a CPU 0 and a CPU 1 in FIG. 4.

In specific implementation, in an embodiment, the network node 40 may include a plurality of processors, for example, the processor 401 and a processor 408 in FIG. 4. Each of the processors may be a single-core (single-CPU) processor or a multi-core (multi-CPU) processor. The processor herein may refer to one or more devices, circuits, and/or processing cores configured to process data (for example, a computer program instruction).

In specific implementation, in an embodiment, the network node 40 may further include an output device 405 and an input device 406.

First, it should be noted that a terminal in this embodiment of this application may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. Alternatively, the terminal may be a station (ST) in a wireless local area network (WLAN), and may be a cellular phone, a cordless phone, a session initiation protocol (SIP) phone, a wireless local loop (WLL) station, a personal digital assistant (PDA) device, a handheld device having a wireless communication function, a computing device, or another processing device connected to a wireless modem, a vehicle-mounted device, or a wearable device (which may also be referred to as a wearable intelligent device). Alternatively, the terminal may be a terminal in a next generation communications system, for example, a terminal in 5G or a terminal in a future evolved public land mobile network (PLMN), or a terminal in a new radio (NR) communications system.

An RN may be a device such as a customer premises equipment (CPE) and a residential gateway (RG). In this case, the RN and another node may be wiredly connected. A method provided in this embodiment of this application may be further applied to a home access scenario.

To reduce implementation complexity and costs of the RN, this embodiment of this application further provides another first node and another second node. The following separately describes the first node and the second node.

The first node includes a control-plane protocol layer, and the control-plane protocol layer includes a peer first protocol layer with the second node on an interface between the first node and the second node. Correspondingly, the second node also includes a control-plane protocol layer, and the control-plane protocol layer includes a peer first protocol layer with the first node on the interface between the second node and the first node. The first node is an RN, or a donor base station, a centralized unit (CU) of a donor base station, or a distributed unit (DU) of a donor base station, and the second node is an RN.

The first protocol layer in the first node is used to send a first message to the peer first protocol layer on the interface between the first node and the second node. Correspondingly, the first protocol layer in the second node is used to receive the first message from the peer first protocol layer on the interface between the second node and the first node. The first message includes context management information of a terminal served by the second node and/or a radio resource control (RRC) message of the terminal.

Currently, an RRC layer is defined between a base station/RN and the terminal, and an RRC message of the terminal is generated and sent by the base station/RN. The RRC message is used to manage and configure a connection between the base station/RN and UE. Therefore, it may be understood that the first protocol layer and the RRC layer in this embodiment of this application are different function layers.

The CU of the donor base station and the DU of the donor base station may be independent devices. The CU of the donor base station and the DU of the donor base station may also be an integrated device, and the CU and the DU form the donor base station.

According to the first node and the second node provided in this embodiment of this application, the first node may configure, by using the first message, the context management information of the terminal served by the second node, and/or send the RRC message to the terminal via the second node, so that some functions originally performed by the second node are implemented by the first node. Therefore, implementation complexity and costs of the second node can be reduced.

In a possible implementation, the first node and the second node transmit data through no other nodes. In this case, the control-plane protocol layers in the first node and the second node may be in any one of the following cases 1 to 4.

Case 1

Figure 5:
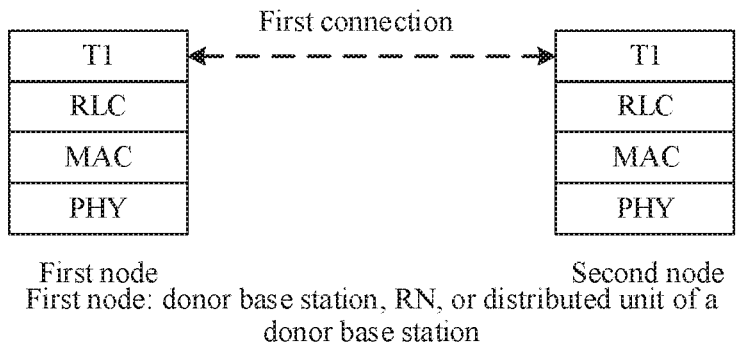
FIG. 5 to FIG. 18 each are a schematic architectural diagram of a protocol layer according to an embodiment of this application.

If the first node is the donor base station, the RN, or the distributed unit of the donor base station, the control-plane protocol layer in the first node includes, from top to bottom, the peer first protocol layer, a peer RLC layer, a peer MAC layer, and a peer PHY layer with the second node on the interface between the first node and the second node. Correspondingly, the control-plane protocol layer in the second node includes, from top to bottom, the peer first protocol layer, a peer RLC layer, a peer MAC layer, and a peer PHY layer with the first node on the interface between the second node and the first node. In this case, for the control-plane protocol layers included in the first node and the second node, refer to FIG. 5.

Figure 6:
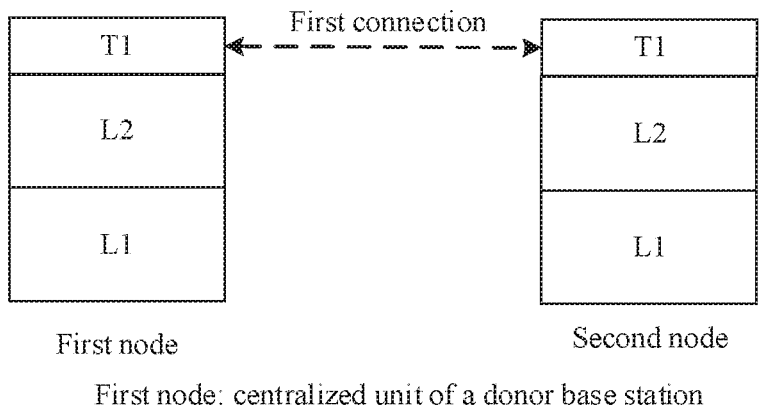

If the first node is the centralized unit of the donor base station, the control-plane protocol layer in the first node includes, from top to bottom, the peer first protocol layer, a peer wiredly connected link layer, and a peer wiredly connected physical layer with the second node on the interface between the first node and the second node. Correspondingly, the control-plane protocol layer in the second node includes, from top to bottom, the peer first protocol layer, a peer wiredly connected link layer, and a peer wiredly connected physical layer with the first node on the interface between the second node and the first node. In this case, for the control-plane protocol layers included in the first node and the second node, refer to FIG. 6.

Case 2

Compared with the case 1, the control-plane protocol layer in the first node further includes a peer second protocol layer with the second node on the interface between the first node and the second node. The control-plane protocol layer in the second node further includes a peer second protocol layer with the first node on the interface between the second node and the first node.

Figure 7:
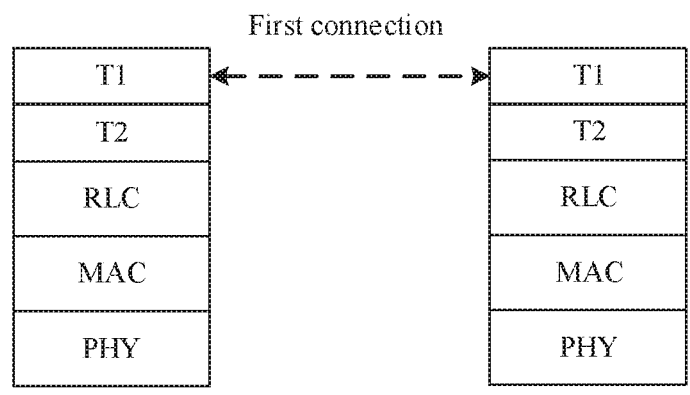

In this case, if the first node is the donor base station, the RN, or the distributed unit of the donor base station, the second protocol layer in the first node is located between the first protocol layer and the RLC layer in the first node. Correspondingly, the second protocol layer in the second node is located between the first protocol layer and the RLC layer in the second node. In this case, for the control-plane protocol layers included in the first node and the second node, refer to FIG. 7.

Figure 8:
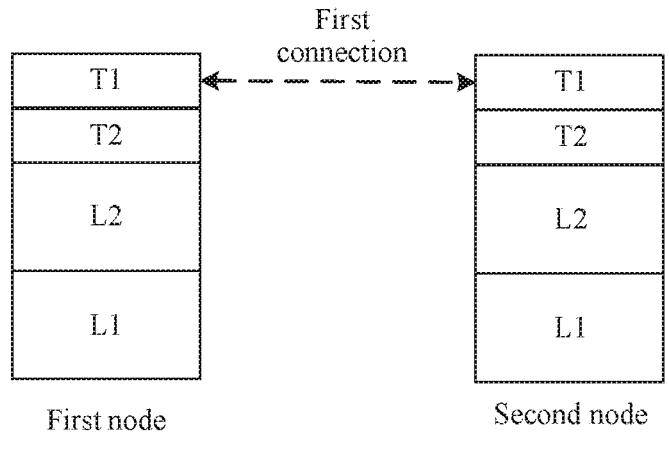

If the first node is the centralized unit of the donor base station, the second protocol layer in the first node is located between the first protocol layer and the wiredly connected link layer in the first node. Correspondingly, the second protocol layer in the second node is located between the first protocol layer and the wiredly connected link layer in the second node. In this case, for the control-plane protocol layers included in the first node and the second node, refer to FIG. 8.

It should be noted that, in the accompanying drawings in this embodiment of this application, "T" in a control-plane protocol layer represents a "first protocol layer", the first protocol layer may also be referred to as an F1 application protocol (F1-AP) layer, "T2" represents a "second protocol layer", "L2" represents a "wiredly connected link layer", and "L1" represents a "wiredly connected physical layer".

Case 3

Compared with the case 2, the control-plane protocol layer in the first node further includes at least one of a peer SCTP layer, a peer IP layer, and a peer PDCP layer with the second node on the interface between the first node and the second node. The control-plane protocol layer in the second node further includes at least one of a peer SCTP layer, a peer IP layer, and a peer PDCP layer with the first node on the interface between the second node and the first node.

Figure 9:
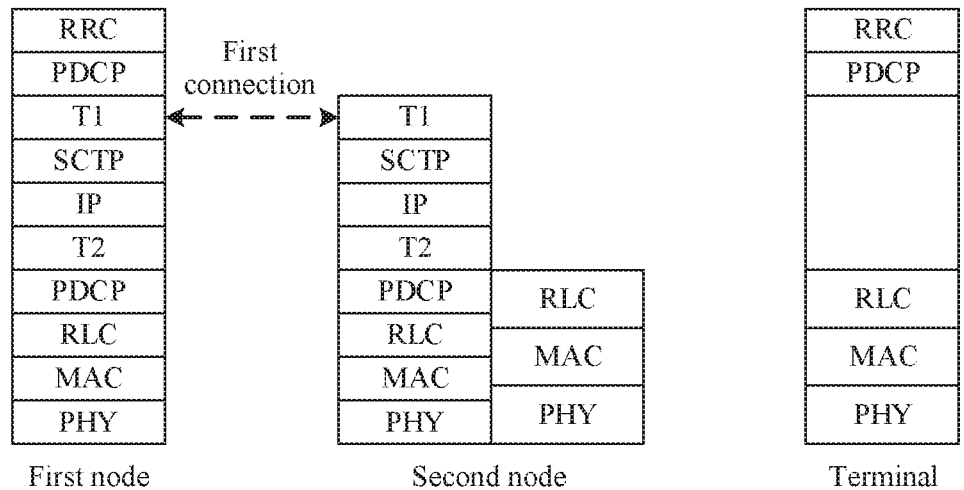

In this case, if the control-plane protocol layer in the first node further includes the peer SCTP layer, the peer IP layer, and the peer PDCP layer with the second node on the interface between the first node and the second node, and the control-plane protocol layer in the second node further includes the peer SCTP layer, the peer IP layer, and the peer PDCP layer with the first node on the interface between the second node and the first node, and if the first node is the donor base station, the RN, or the distributed unit of the donor base station, for the control-plane protocol layers included in the first node and the second node, refer to FIG. 9. If the first node is the centralized unit of the donor base station, for the control-plane protocol layers included in the first node and the second node, refer to FIG. 10.

Figure 10:
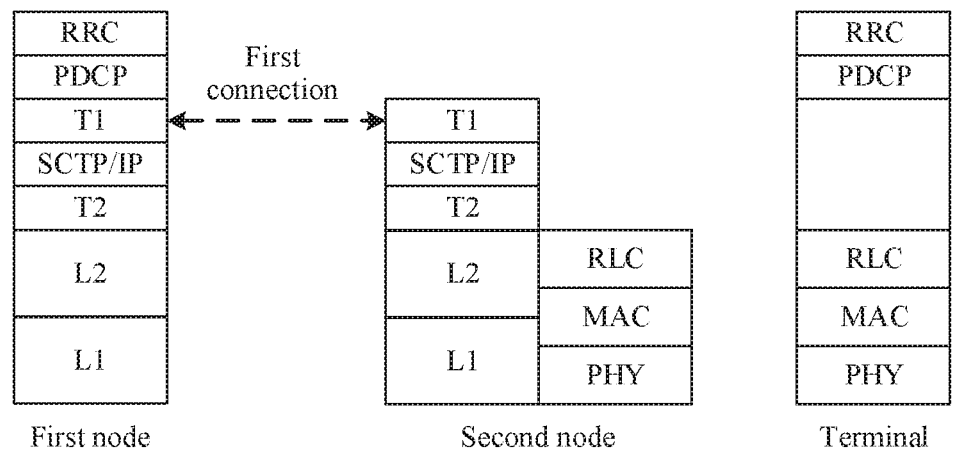

It may be understood that, at the control-plane protocol layers shown in FIG. 9 and FIG. 10, if the first node does not include one or two of the SCTP layer, the IP layer, and the PDCP layer (peer ones with the second node), the control-plane protocol layer in the first node may be obtained by removing, from the control-plane protocol layer in the first node shown in FIG. 9, a protocol layer that is not included in the first node. This is the same for the second node.

Case 4

Compared with the case 3, the control-plane protocol layer in the first node further includes at least one of a peer RRC layer and a peer PDCP layer with the terminal on an interface between the first node and the terminal. In this case, if the control-plane protocol layer in the first node further includes the peer RRC layer and the peer PDCP layer with the terminal on the interface between the first node and the terminal, and if the first node is the donor base station, the RN, or the distributed unit of the donor base station, for the control-plane protocol layers included in the first node and the second node, refer to FIG. 9; if the first node is the centralized unit of the donor base station, for the control-plane protocol layers included in the first node and the second node, refer to FIG. 10. When reference may be made to FIG. 10 for the control-plane protocol layers included in the first node and the second node, the second node and the first node may be wiredly connected.

It may be understood that, at the control-plane protocol layers shown in FIG. 9 and FIG. 10, if the first node does not include either of the RRC layer and the PDCP layer (peer ones with the terminal), the control-plane protocol layer in the first node may be obtained by removing, from the control-plane protocol layer in the first node shown in FIG. 9 or FIG. 10, a protocol layer that is not included in the first node.

If a message transmitted between the first protocol layer in the first node and the first protocol layer in the second node is denoted as an F1AP message, to ensure security of the F1AP message, security protection may be performed on the F1AP message. This may be specifically implemented in the following several manners.

Manner (1): A PDCP layer security function (for example, encryption and/or integrity protection is performed on the F1AP message) is configured on the first node and the second node.

Manner (2): A transport layer-based security protection mechanism (for example, an IP-based network domain security (NDS/IP for short) mechanism provides a secure transmission channel for the F1AP message. For example, the secure transmission channel may be an internet protocol security (IPSec) tunnel.

Manner (3): Security protection (for example, encryption and/or integrity protection is performed on the F1AP message) is performed on the F1AP message at the second protocol layer.

In this embodiment of this application, it is considered that in a sending processing process, a protocol layer at which a data packet is first processed is above a protocol layer at which the data packet is processed later. Certainly, an up-down relationship between protocol layers may also be defined in another manner. For example, if it is defined that during receiving processing, a layer at which a data packet is first processed is above a protocol layer at which the data packet is processed later, the RLC layer in the control-plane protocol layer in the first node in the foregoing embodiment is located above the first protocol layer.

Optionally, the second protocol layer in the first node is used to perform at least one of the following processing on the first message: adding routing information for the first message, and adding a data packet type identifier for the first message; and the second protocol layer in the first node is further used to send, to the peer second protocol layer on the interface between the first node and the second node, the first message processed by the second protocol layer in the first node.

Optionally, the second protocol layer in the first node is further used to determine a radio bearer (RB), a logical channel (LCH), an RLC channel, or an RLC bearer on which the first message processed by the second protocol layer in the first node is sent; and the second protocol layer in the first node is specifically used to send, to the peer second protocol layer on the interface between the first node and the second node on the determined RB, logical channel, RLC channel, or RLC bearer, the first message processed by the second protocol layer in the first node.

The RB may be a signaling radio bearer (SRB) or a data radio bearer (DRB). The RB may be mapped to one RLC channel in a one-to-one manner, and/or the RLC channel, the RLC bearer, and the logical channel are mapped in a one-to-one manner. The RLC channel is a channel between the RLC layer and an upper-layer protocol layer. The RB corresponds to configurations of a higher-layer (for example, the PDCP layer) part and a lower-layer (for example, the RLC layer and the MAC layer) part. The RLC bearer is a configuration of a lower-layer part corresponding to the RB, and specifically includes configurations of an RLC layer entity and a MAC logical channel. For detailed explanations about the RLC bearer, refer to related explanations in the 3GPP TS 37.340 v 15.3, communication protocol.

Correspondingly, the second protocol layer in the second node is used to receive, from the peer second protocol layer on the interface between the second node and the first node, the first message processed by the second protocol layer in the first node, and the second protocol layer in the first node performs at least one of the following processing on the first message: adding routing information for the first message, and adding a data packet type identifier for the first message: and the second protocol layer in the second node is further used to obtain at least one of the routing information of the first message and the data packet type identifier of the first message; and if the second protocol layer in the second node obtains the routing information of the first message, the second protocol layer in the second node is further used to route the first message based on the routing information of the first message; or if the second protocol layer in the second node determines that the second node is a destination node of the first message, the second protocol layer in the second node obtains the data packet type identifier of the first message, and the data packet type identifier of the first message indicates that the first message is a first protocol layer message, the second protocol layer in the second node is further used to send the first message to the first protocol layer in the second node.

Optionally, the first protocol layer in the second node is further used to send a second message to the peer first protocol layer on the interface between the second node and the first node. Correspondingly, the first protocol layer in the first node is further used to receive the second message from the peer first protocol layer on the interface between the first node and the second node.

The second message includes at least one of the following information: management information of a first connection, the context management information of the terminal served by the second node, the RRC message of the terminal, a first identifier, and a second identifier; the context management information that is of the terminal served by the second node and that is included in the second message includes a third identifier, the third identifier is a user-plane transmission channel identifier allocated by the second node to the terminal, the first identifier is a first connection identifier allocated by the first node to the terminal, the second identifier is a first connection identifier allocated by the second node to the terminal, and the first connection is a logical connection that is on the interface between the first node and the second node and that is based on the peer first protocol layer.

Optionally, the first protocol layer in the first node is further used to send a third message to the peer first protocol layer on the interface between the first node and the second node. Correspondingly, the first protocol layer in the second node is further used to receive the third message from the peer first protocol layer on the interface between the second node and the first node.

The third message includes at least one of the following information: the management information of the first connection, the first identifier, and the second identifier; the first identifier is the first connection identifier allocated by the first node to the terminal, the second identifier is the first connection identifier allocated by the second node to the terminal, and the first connection is the logical connection that is on the interface between the first node and the second node and that is based on the peer first protocol layer.

Optionally, the context management information that is of the terminal served by the second node and that is included in the first message includes a fourth identifier, and the fourth identifier is a user-plane transmission channel identifier allocated by the first node to the terminal.

In another possible implementation, the first node and the second node transmit data through a third node. In this case, the control-plane protocol layers in the first node, the second node, and the third node may be in any one of the following cases 5 to 7.

Case 5

Figure 11:
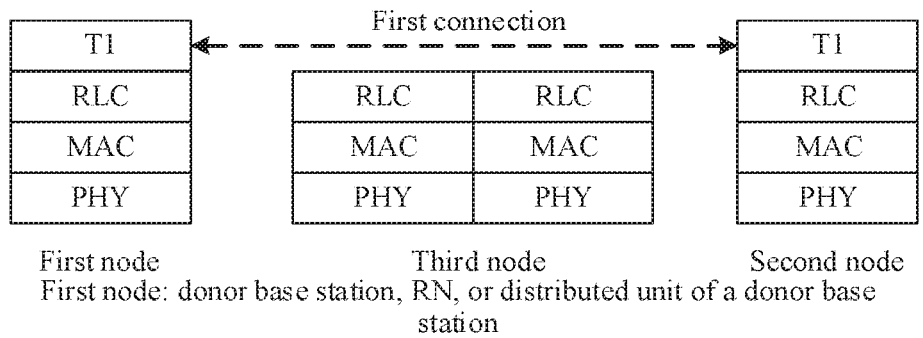

If the first node is the donor base station, the RN, or the distributed unit of the donor base station, the control-plane protocol layer in the first node includes, from top to bottom, the peer first protocol layer with the second node on the interface between the first node and the second node, and a peer RLC layer, a peer MAC layer, and a peer PHY layer with the third node on an interface between the first node and the third node. Correspondingly, the control-plane protocol layer in the second node includes, from top to bottom, the peer first protocol layer with the first node on the interface between the second node and the first node, and a peer RLC layer, a peer MAC layer, and a peer PHY layer with the third node on an interface between the second node and the third node. In this case, for the control-plane protocol layers included in the first node, the second node, and the third node, refer to FIG. 11. In this case, the third node may be an RN.

Figure 12:
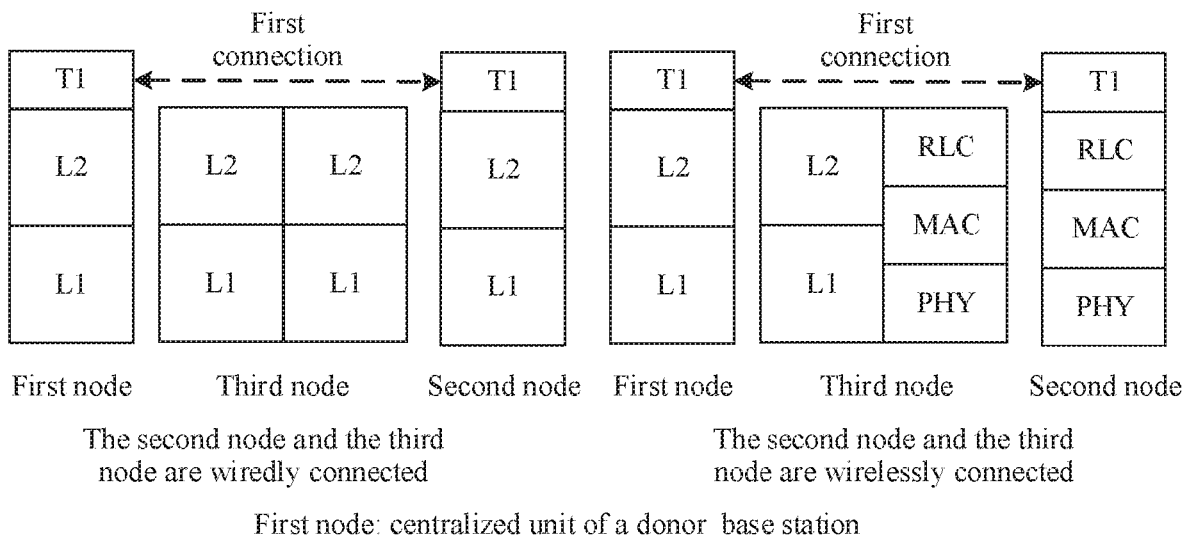

If the first node is the centralized unit of the donor base station, the control-plane protocol layer in the first node includes, from top to bottom, the peer first protocol layer of the second node on the interface between the first node and the second node, and a peer wiredly connected link layer and a peer wiredly connected physical layer with the third node on the interface between the first node and the third node. Correspondingly, if the second node and the third node are wiredly connected, the control-plane protocol layer in the second node includes, from top to bottom, the peer first protocol layer with the first node on the interface between the second node and the first node and a peer wiredly connected link layer and a peer wiredly connected physical layer with the third node on the interface between the second node and the third node. Alternatively, if the second node and the third node are wirelessly connected, the control-plane protocol layer in the second node includes, from top to bottom, the peer first protocol layer with the first node on the interface between the second node and the first node, and a peer RLC layer, a peer MAC layer, and a peer PHY layer with the third node on the interface between the second node and the third node. In this case, for the control-plane protocol layers included in the first node, the second node, and the third node, refer to FIG. 12. In this case, the third node may be an RN or a DU of the donor base station. If the third node is the RN, the RN and the first node are wiredly connected.

Case 6

Compared with the case 5, the control-plane protocol layer in the first node further includes a peer second protocol layer with the third node on the interface between the first node and the third node. The control-plane protocol layer in the second node further includes a peer second protocol layer with the third node on the interface between the second node and the third node.

Figure 13:
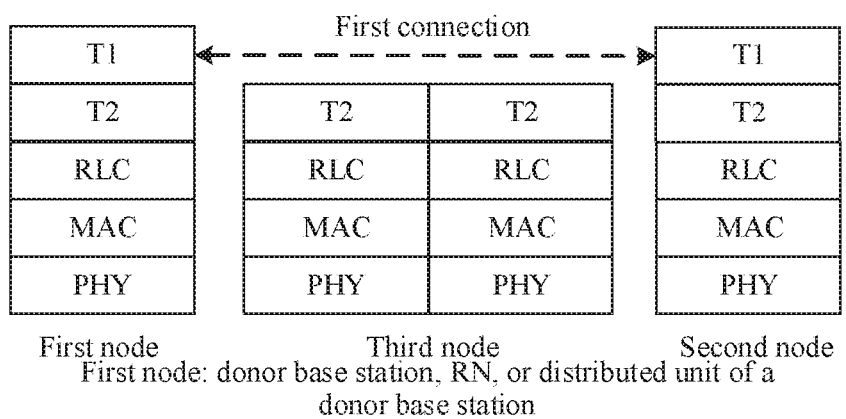

If the first node is the donor base station, the RN, or the distributed unit of the donor base station, the second protocol layer in the first node is located between the first protocol layer and the RLC layer in the first node. The second protocol layer in the second node is located between the first protocol layer and the RLC layer in the second node. In this case, for the control-plane protocol layers included in the first node, the second node, and the third node, refer to FIG. 13.

Figure 14:
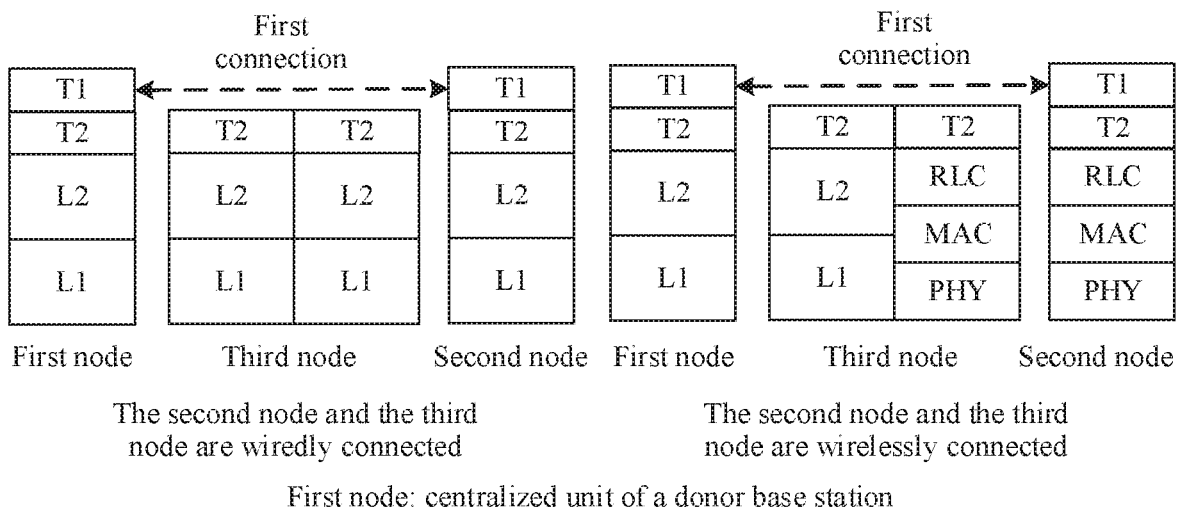

If the first node is the centralized unit of the donor base station, the second protocol layer in the first node is located between the first protocol layer and the wiredly connected link layer in the first node. If the second node and the third node are wiredly connected, the second protocol layer in the second node is located between the first protocol layer and the wiredly connected link layer in the second node; or if the second node and the third node are wirelessly connected, the second protocol layer in the second node may also be located between the first protocol layer and the RLC layer in the second node. In this case, for the control-plane protocol layers included in the first node, the second node, and the third node, refer to FIG. 14.

Case 7

Compared with the case 6, the control-plane protocol layer in the first node further includes at least one of a peer SCTP layer and a peer IP layer with the second node on the interface between the first node and the second node, and a peer PDCP layer with the third node on the interface between the first node and the third node. The control-plane protocol layer in the second node further includes at least one of a peer SCTP layer and a peer IP layer with the first node on the interface between the second node and the first node, and a peer PDCP layer with the third node on the interface between the second node and the third node.

Figure 15:
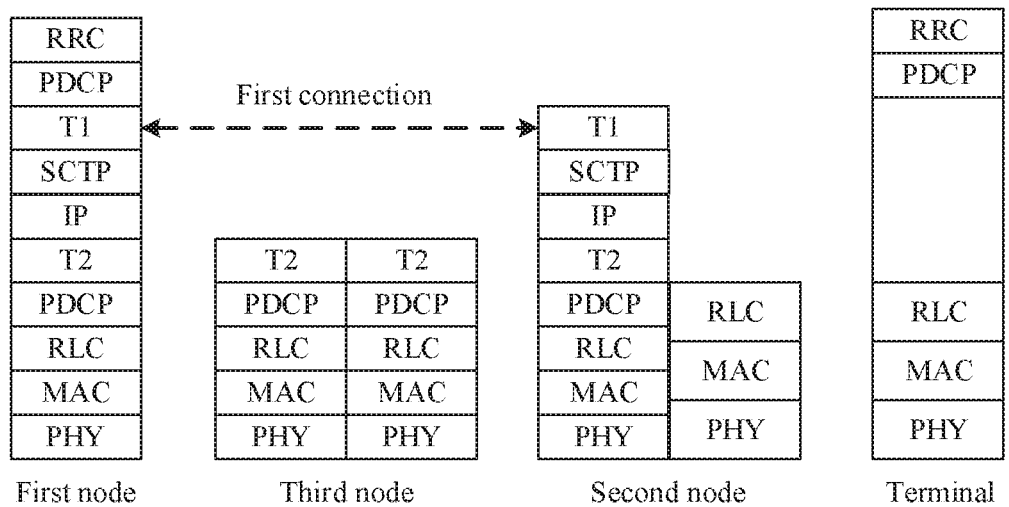

In this case, if the control-plane protocol layer in the first node further includes the peer SCTP layer and the peer IP layer with the second node on the interface between the first node and the second node and the peer PDCP layer with the third node on the interface between the first node and the third node, and the control-plane protocol layer in the second node further includes the peer SCTP layer and the peer IP layer with the first node on the interface between the second node and the first node and the peer PDCP layer with the third node on the interface between the second node and the third node, and if the first node is the donor base station, the RN, or the distributed unit of the donor base station, for the control-plane protocol layers included in the first node and the second node, refer to FIG. 15.

It may be understood that, at the control-plane protocol layers shown in FIG. 15, if the first node does not include one or two of the SCTP layer, the IP layer, and the PDCP layer (peer ones with the third node), the control-plane protocol layer in the first node may be obtained by removing, from the control-plane protocol layer in the first node shown in FIG. 15, a protocol layer that is not included in the first node. This is the same for the second node.

In another possible implementation, there may be no PDCP layer in the control-plane protocol layer in the third node. In this case, the control-plane protocol layer in the first node includes the peer PDCP layer with the second node on the interface between the first node and the second node, and the control-plane protocol layer in the second node includes the peer PDCP layer with the first node on the interface between the second node and the first node.

It may be understood that when the first node and the second node transmit data through the third node, the first message, the second message, and the third message all need to be transmitted through the third node.

A relay network in LTE R10 does not support multi-hop relay networking. It can be learned from the control-plane protocol layer provided in this embodiment of this application that multi-hop relay networking can be implemented in this embodiment of this application, thereby expanding network coverage, improving a network capacity, and further reducing networking costs.

To ensure information security, security protection may be performed on the F1AP message. Specifically, the security protection may be implemented in the manner (2) or the manner (3), or may be implemented by configuring a PDCP layer security function on the interface between the first node and the third node and the interface between the third node and the second node. When there is no PDCP layer in the control-plane protocol layer in the third node, security protection on the F1AP message may be further implemented by using a peer PDCP layer security function configured on the interface between the first node and the second node.

Optionally, the second protocol layer in the first node is used to perform at least one of the following processing on the first message: adding routing information for the first message, adding a data packet type identifier for the first message, and adding a bearer identifier of a first interface for the first message, where the first interface is a communications interface between the third node and the second node; and the second protocol layer in the first node is further used to send, to a peer second protocol layer on the interface between the first node and the third node, the first message processed by the second protocol layer in the first node. Optionally, the second protocol layer in the first node is further used to determine an RB, a logical channel, an RLC channel, or an RLC bearer on which the first message processed by the second protocol layer in the first node is sent; and the second protocol layer in the first node is specifically used to send, to the peer second protocol layer on the interface between the first node and the third node on the determined RB, logical channel, RLC channel, or RLC bearer, the first message processed by the second protocol layer in the first node.

Optionally, the second protocol layer in the third node is used to receive, from the peer second protocol layer on the interface between the third node and the first node, the first message processed by the second protocol layer in the first node, and the second protocol layer in the first node performs at least one of the following processing on the first message: adding routing information for the first message, adding a data packet type identifier for the first message, and adding a bearer identifier of a first interface for the first message, where the first interface is a communications interface between the third node and the second node.

The second protocol layer in the third node is further used to obtain at least one of the routing information of the first message, the bearer identifier of the first interface of the first message, and the data packet type identifier of the first message.

The second protocol layer in the third node is further used to perform at least one of the following processing on the first message: adding the routing information for the first message, and adding the data packet type identifier for the first message.

The second protocol layer in the third node is further used to send, to a peer second protocol layer on the interface between the third node and the second node, the first message processed by the second protocol layer in the third node.

The second protocol layer in the third node obtains the routing information of the first message, and the second protocol layer in the third node is further used to route, based on the routing information of the first message, the first message processed by the second protocol layer in the third node; and/or the second protocol layer in the third node obtains the bearer identifier of the first interface, and the second protocol layer in the third node sends, based on the bearer identifier of the first interface on a bearer, a logical channel, an RLC channel, or an RLC bearer corresponding to the first interface, the first message processed by the second protocol layer in the third node.

Optionally, the second protocol layer in the second node is used to receive, from the peer second protocol layer on the interface between the second node and the third node, the first message processed by the second protocol layer in the third node, where the second protocol layer in the third node performs at least one of the following processing on the first message: adding routing information for the first message, and adding a data packet type identifier for the first message.

The second protocol layer in the second node is further used to obtain at least one of the routing information of the first message and the data packet type identifier of the first message; and if the second protocol layer in the second node obtains the routing information of the first message, the second protocol layer in the second node is further used to route the first message based on the routing information of the first message; or if the second protocol layer in the second node determines that the second node is a destination node of the first message, the second protocol layer in the second node obtains the data packet type identifier of the first message, and the data packet type identifier of the first message indicates that the first message is a first protocol layer message, the second protocol layer in the second node is further used to send the first message to the first protocol layer in the second node.

Figure 16:
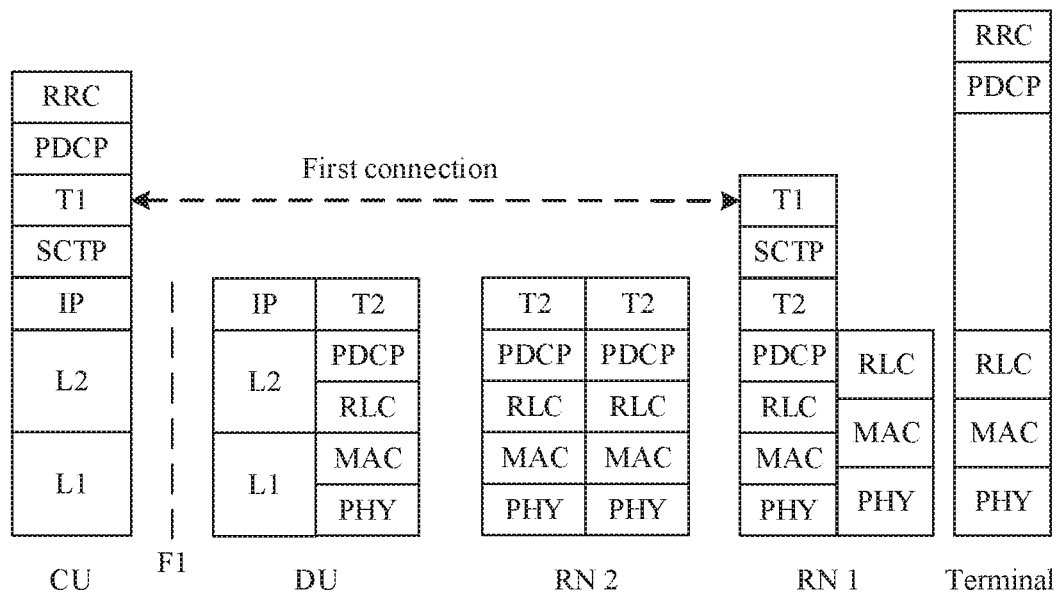
Figure 17:
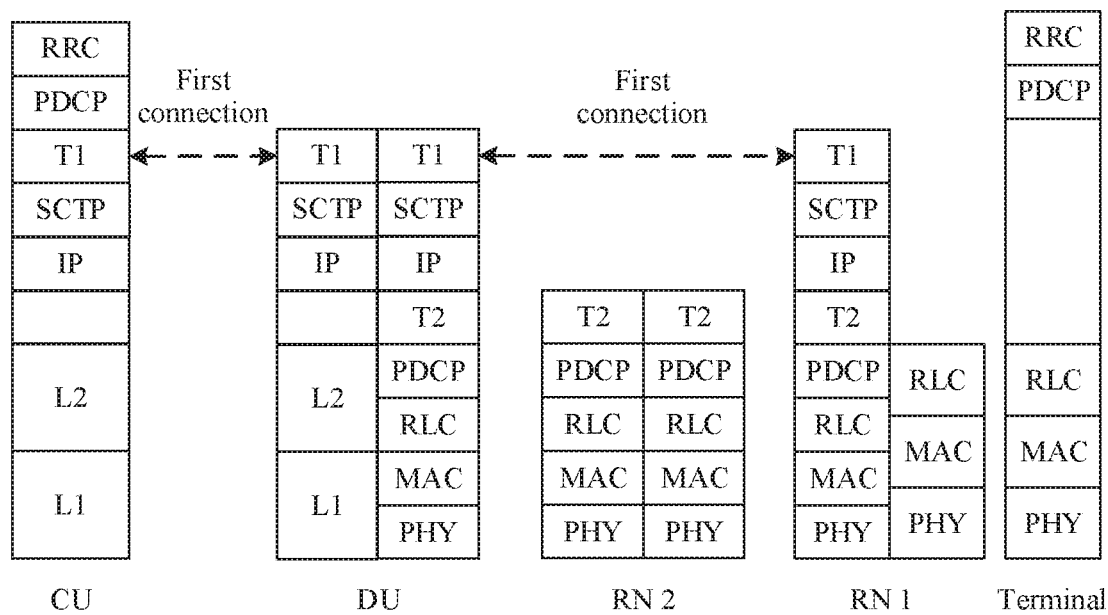
Figures 18, 19:
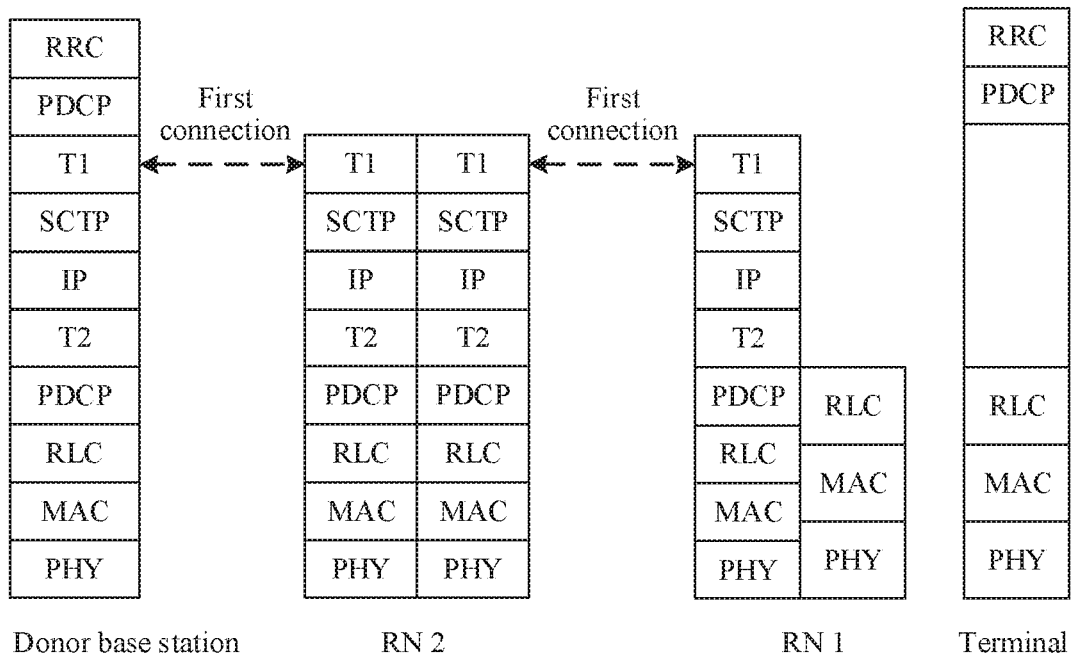
FIG. 19 is a flowchart of a communication method according to an embodiment of this application.

FIG. 16 to FIG. 18 in the embodiments of this application each show a possible schematic diagram of a control-plane protocol layer of a node. In FIG. 16 to FIG. 18, some protocol layers are optional protocol layers, and the optional protocol layers may exist or may not exist in a protocol layer architecture. For example, in FIG. 16, SCTP layers in a CU and an RN 1 are optional protocol layers, and peer PDCP layers on two nodes a DU and an RN 2 and peer PDCP layers on two nodes the RN 2 and the RN 1 are also optional protocol layers. In FIG. 17, two of PDCP layers that are peer to one another on a DU, an RN 2, and an RN 1 are optional protocol layers, and peer SCTP layers and/or IP layers on the DU and the RN 1 are also optional protocol layers. In FIG. 18, two of SCTP layers, IP layers, and PDCP layers that are peer to one another between a donor base station and an RN 2 and between the RN 2 and an RN 1 are optional protocol layers. Specifically, there may be no PDCP layer, or there may be no SCTP layer and IP layer.

It should be noted that an interface between nodes and/or an interface between a node and a terminal in this embodiment of this application may also be referred to as a reference point. In addition, in this embodiment of this application, a protocol layer up-down relationship between a T2 layer and a PDCP layer adjacent to the T2 layer is not specifically limited. To be specific, the T2 layer may be located below the PDCP layer adjacent to the T2 layer, and a function of the PDCP layer may also be integrated into the T2 layer. In other words, the T2 layer may implement encryption, integrity protection, and the like on a data packet.

In descriptions of this embodiment of this application, "X in N1 is used to send D to peer X on an interface between N1 and N2" may also be described as "X in N1 is used to send D to peer X in N2", and "X in N1 is used to receive D from peer X on an interface between N1 and N2" may also be described as "X in N1 is used to receive D from peer X in N2". N1 and N2 refer to nodes. For example, N1 may be a first node, and N2 may be a second node. X is a protocol layer. For example, X may be a first protocol layer. D refers to a message or a data packet. For example, D may be a first message.

For explanations of parts related to the following in the foregoing embodiments, refer to related parts in the following.

In the following embodiments, Un represents a wireless backhaul interface, such as an interface between a donor base station and an RN, and an interface between RNs. A first protocol layer message may be denoted as an F1AP message. A first connection is denoted as an F1 connection. The following uses this denotation manner as an example to describe an example of a method provided in the embodiments of this application. However, it may be understood that this denotation manner is merely an example. In an actual implementation, an interface name and a message name may alternatively be other names.

An embodiment of this application provides a communication method, applied to a first node and a second node. The first node includes a control-plane protocol layer, the control-plane protocol layer in the first node includes a peer first protocol layer with the second node on an interface between the first node and the second node, the control-plane protocol layer in the second node includes a peer first protocol layer with the first node on the interface between the second node and the first node, the first node is an RN, a donor base station, a centralized unit of a donor base station, or a distributed unit of a donor base station, and the second node is an RN. As shown in FIG. 19, the method includes the following steps.

1901: The first node sends, at the first protocol layer, a first message to the peer first protocol layer on the interface between the first node and the second node.

1902: The second node receives, at the first protocol layer, the first message from the peer first protocol layer on the interface between the second node and the first node.

The first message includes context management information of a terminal served by the second node and/or an RRC message of the terminal. It may be understood that the context management information that is of the terminal served by the second node and that is included in the first message is downlink context management information of the terminal served by the second node, and the RRC message of the terminal is a downlink RRC message of the terminal.

For example, the context management information that is of the terminal served by the second node and that is included in the first message may include at least one of the following information: an identifier of UE (for example, a first identifier allocated by the first node to the UE, or a second identifier allocated by the second node to the UE), a list of UE RBs (RBs may be SRBs and/or DRBs) that need to be established, modified, or released, and a list of UE DRBs that fail to be established or modified (including IDs (identifier) of the UE DRBs that fail to be established or modified, and a cause for an establishment or modification failure). The list of UE RBs that need to be established, modified, or released includes at least one of the following information: a UE SRB ID, a configuration parameter of a UE SRB, a UE DRB ID, a quality of service (QoS) parameter of a UE DRB, an evolved universal terrestrial radio access network (E-UTRAN) QoS parameter (QoS parameter at an evolved radio access bearer (E-RAB) granularity), information about a general packet radio service tunneling protocol (GTP) tunnel that corresponds to the UE DRB and that needs to be established (the information includes, for example, an uplink endpoint identifier of the GTP tunnel on the first node and a transport layer address of the first node), a UE QoS flow ID, a QoS parameter of a UE QoS flow, a mapping relationship between the UE QoS flow and the UE DRB, a mapping relationship between a UE RB/QoS flow and an RB between the second node and a parent node of the second node, a UE context release indication (which may include a release cause), a UE context release completion indication, and the like. The RRC message of the terminal included in the first message may include at least one of the following information: an RRC connection establishment message, an RRC reconfiguration message, and the like.

In this embodiment of this application, the QoS parameter of the DRB/E-RAB may include parameters such as a QoS class identifier (QCI), an allocation and retention priority (ARP), a maximum bit rate (MBR), and a guaranteed bit rate (GBR). The QoS parameter of the QoS flow may include parameters such as a 5G QoS identifier (5QI), an ARP, a guaranteed flow bit rate (GFBR), and a maximum flow bit rate (MFBR). For specific parameters included in the QoS parameter of the DRB/E-RAB and the QoS parameter of the QoS flow, refer to the prior art. This is not limited in this embodiment of this application.

Optionally, the context management information that is of the terminal served by the second node and that is included in the first message includes a fourth identifier, and the fourth identifier is a user-plane transmission channel identifier allocated by the first node to the terminal.

It should be noted that the first message sent by the first node to the second node may be a first message sent to the second node through another node, or may be a first message sent to the second node not through another node.

The first message is an F1AP message. Specifically, a sending node may send the F1AP message on the SRB or the DRB. The sending node may be the first node. In this case, a receiving node is the second node. Alternatively, the sending node may be the second node. In this case, the receiving node may be the first node.

If the F1AP message is transmitted between the first node and the second node through a third node, because when the second node serves as the terminal, an RRC message of the second node is carried on an SRB for sending, and the third node may perform different processing when receiving the F1AP message and the RRC message of the second node. For example, when receiving the F1AP message sent by the second node, the third node needs to forward a data packet in the F1AP message to the first node based on routing information in the F1AP message. When receiving the RRC message sent by the second node, the third node needs to encapsulate the RRC message in the F1AP message of the third node and send the F1AP message to the first node. Therefore, the receiving node needs to be able to distinguish whether the RRC message or the F1AP message is received. When the F1AP message is sent on the DRB, the receiving node also needs to be able to distinguish whether a user plane data packet or the F1AP message is received.

Specifically, the receiving node may distinguish the received message in the following several manners.

Manner 1

If the sending node sends the F1AP message on the SRB, the received message is distinguished by using the SRB ID, to be specific, the RRC message and the F1AP message are sent on different SRBs.

If the sending node sends the F1AP message on the DRB, the received message is distinguished by using the DRB ID, to be specific, the user plane data and the F1AP message are sent on different DRBs.

It should be noted that an RB (including an SRB and/or a DRB) of a node may uniquely correspond to an RLC channel, an RLC bearer, or a logical channel of the node. Therefore, in this specification, that different message types are distinguished by using SRB IDs and/or DRB IDs may alternatively be that the message types are distinguished by using identifiers of RLC channels, RLC bearers, or logical channels.

Manner 2

A data packet type identifier is added to the data packet, and the data packet type identifier is used to identify a data packet type, so that the receiving node determines whether the F1AP message or the RRC message is received.

For example, the data packet type identifier may be added to a second protocol layer or an RLC layer, or may be added to another protocol layer. In a possible implementation, when a value of a data packet type field is a particular value, it indicates that a message type is an F1AP message.

Manner 3

When the first node and the second node include an SCTP layer and an IP layer, the received message is distinguished by using an IP address (including a source IP address and/or a destination IP address) and/or an SCTP port number (including a source SCTP port number and/or a destination SCTP port number).

It should be noted that, it can be learned from the foregoing description of the protocol layer that, that the first node sends, at the first protocol layer, the first message to the peer first protocol layer on the interface between the first node and the second node does not mean that the first message is directly sent to the peer protocol layer. In an actual sending process, the first message needs to be processed at a lower-layer protocol layer and finally sent out on a physical-layer link. Similarly, for the second node, that the second node receives, at the first protocol layer, the first message from the peer first protocol layer on the interface between the second node and the first node does not mean that the first message is directly received from the peer protocol layer, but is received from a physical layer, and then is obtained after being processed at a lower-layer protocol layer. Other similar descriptions in this embodiment of this application are similar.

According to the method provided in this embodiment of this application, the first node may configure, by using the first message, the context management information of the terminal served by the second node, and/or send the RRC message to the terminal via the second node, so that some functions originally performed by the second node are implemented by the first node. Therefore, implementation complexity and costs of the second node can be reduced.

Optionally, the control-plane protocol layer in the first node further includes a peer second protocol layer with the second node on the interface between the first node and the second node: and if the first node is the donor base station, the RN, or the distributed unit of the donor base station, the control-plane protocol layer in the first node includes, from top to bottom, the peer first protocol layer, the peer second protocol layer, a peer RLC layer, a peer MAC layer, and a peer PHY layer with the second node on the interface between the first node and the second node; or if the first node is the centralized unit of the donor base station, the control-plane protocol layer in the first node includes, from top to bottom, the peer first protocol layer, the peer second protocol layer, a peer wiredly connected link layer, and a peer wiredly connected physical layer with the second node on the interface between the first node and the second node. Correspondingly, the control-plane protocol layer in the second node further includes a peer second protocol layer of the first node on the interface between the second node and the first node: and if the first node is the donor base station, the RN, or the distributed unit of the donor base station, the control-plane protocol layer in the second node includes, from top to bottom, the peer first protocol layer, the peer second protocol layer, a peer RLC layer, a peer MAC layer, and a peer PHY layer with the first node on the interface between the second node and the first node: or if the first node is the centralized unit of the donor base station, the control-plane protocol layer in the second node includes, from top to bottom, the peer first protocol layer, the peer second protocol layer, a peer wiredly connected link layer, and a peer wiredly connected physical layer with the first node on the interface between the second node and the first node.

The method may further include the following steps.

11) The first node performs, at the second protocol layer, at least one of the following processing on the first message: adding routing information for the first message, and adding a data packet type identifier for the first message.

To enable the node to correctly route and forward the received F1AP message, in an implementable manner, a node that sends the F1AP message needs to provide information used for routing. The information used for routing may include identifiers of the first node and the second node, and may further include an identifier of a node configured to forward the F1AP message. The identifier of the node may be a globally unique identifier, or may be a locally unique identifier. For example, the locally unique identifier may be allocated by each node, or allocated by a donor base station or a centralized unit of a donor base station connected to a node by a wireless backhaul link or a multi-hop wireless backhaul link. In another implementable manner, one node may route the F1AP message based on a correspondence between a previous-hop bearer and another node. Specifically, if the second node corresponds to a bearer 1, when the first node receives the F1AP message from the bearer 1, the first node determines, based on the correspondence, to send the F1AP message to the second node.

The data packet type identifier may be used to identify a message type, and the message type may be an RRC message, an F1AP message, or the like.

It should be noted that the processing performed on the first message at the second protocol layer may also be performed at another layer. For example, the processing may be performed in a processing process of another existing protocol layer by extending a function of the another existing protocol layer. For example, the another existing protocol layer may be an RLC layer.

12) The first node sends, at the second protocol layer to the peer second protocol layer on the interface between the first node and the second node, the first message processed by the first node at the second protocol layer.

Optionally, before step 12), the method may further include: determining, by the first node at the second protocol layer, an RB, a logical channel, an RLC channel, or an RLC bearer on which the first message processed by the first node at the second protocol layer is sent. In this case, step 12) includes: sending, by the first node to the peer second protocol layer on the interface between the first node and the second node on the determined RB, logical channel, RLC channel, or RLC bearer at the second protocol layer, the first message processed by the first node at the second protocol layer.

The RB may be an SRB or a DRB.

13) The second node receives, at the second protocol layer from the peer second protocol layer on the interface between the second node and the first node, the first message processed by the second protocol layer in the first node.

14) The second node obtains, at the second protocol layer, at least one of the routing information of the first message and the data packet type identifier of the first message.

After step 14), if the second node obtains the routing information of the first message at the second protocol layer, the second node routes the first message at the second protocol layer based on the routing information of the first message; or if the second protocol layer in the second node determines that the second node is a destination node of the first message, the second node obtains the data packet type identifier of the first message at the second protocol layer, and the data packet type identifier of the first message indicates that the first message is a first protocol layer message, the second node sends, at the second protocol layer, the first message to the first protocol layer in the second node, and the first protocol layer in the second node may obtain information included in the first message.

It should be noted that, if a node determines, based on routing information of a message, that the node is a destination node of the message, the node does not forward the message; or if the node determines that the node is not a destination node of the message, the node routes the message based on information included in the routing information. A node may determine, based on routing information of a message, whether the node is a destination node of the message, or may determine, based on other information, whether the node is a destination node of the message.

Optionally, the method further includes the following steps.

21) The second node sends, at the first protocol layer, a second message to the peer first protocol layer on the interface between the second node and the first node.

22) The first node receives, at the first protocol layer, the second message from the peer first protocol layer on the interface between the first node and the second node.

The second message includes at least one of the following information: management information of a first connection, the context management information of the terminal served by the second node, the RRC message of the terminal, a first identifier, and a second identifier; the context management information that is of the terminal served by the second node and that is included in the second message includes a third identifier, the third identifier is a user-plane transmission channel identifier allocated by the second node to the terminal, the first identifier is a first connection identifier allocated by the first node to the terminal, the second identifier is a first connection identifier allocated by the second node to the terminal, and the first connection is a logical connection that is on the interface between the first node and the second node and that is based on the peer first protocol layer.

It may be understood that various types of information included in the second message are all uplink information.

Specifically, the management information of the first connection in the second message may include at least one of the following information: a first connection establishment request (including, for example, an identifier of the second node, information about a cell served by the second node, and system information of the second node), first connection reset (including, for example, a reset cause and a list of first connections that need to be reset, where the list of first connections includes, for example, all first connections on the interface between the first node and the second node, or a first connection of UE indicated by using a first identifier and/or a second identifier of the UE), a first connection reset acknowledgment (including, for example, a list of first connections that are acknowledged to be reset), an error detection indication (including the first connection of the UE indicated by using the first identifier and/or the second identifier of the UE, an error cause, and the like), a second node configuration update (including cell information that needs to be added/modified/deleted, where the cell information includes a cell identifier, cell configuration information, and system information of the second node), a first node configuration update acknowledgment (including an identifier of a cell that is not successfully activated, a cause for unsuccessful activation, and the like), a first node configuration update failure (including a configuration failure cause, a waiting time, and the like), RRC information sent by the second node to the first node, and the like. The context management information of the terminal served by the second node in the second message may include at least one of the following information: an identifier of the UE (for example, a first identifier allocated by the first node to the UE, or a second identifier allocated by the second node to the UE), a list of established UE SRBs (including IDs of the established SRBs), a list of established/modified UE DRBs (including the IDs of the established DRBs), information about a GTP tunnel that corresponds to the UE DRB and that needs to be established (including, for example, a downlink endpoint identifier of the GTP tunnel on the second node and a transport layer address of the second node), a list of UE DRBs that fail to be established (including IDs of the UE DRBs that fail to be established, a failure cause, and the like), a list of UE SRBs that fail to be established (including IDs of the UE SRBs that fail to be established, a failure cause, and the like), a UE context setup/modification failure indication (which may include a failure cause), a UE context release request (which may include a release cause), a UE context release complete indication, a UE context modification request (which includes, for example, a list of DRBs that need to be modified, where the list of DRBs that need to be modified includes IDs of the DRBs that need to be modified), information about a GTP tunnel that corresponds to the UE DRB and that needs to be established (including, for example, a downlink endpoint identifier of the GTP tunnel on the second node and a transport layer address of the second node), an ID of an SRB that needs to be released, an ID of a DRB that needs to be released, a modification cause, a mapping relationship between an RB/QoS flow of the UE and an RB between the second node and a parent node of the second node, and the like. The RRC message of the terminal in the second message may include at least one of the following information: an RRC connection establishment request, an RRC connection establishment completion message, an RRC reconfiguration completion message, and the like.

For example, the user plane transmission channel identifier may be specifically a tunnel endpoint identifier (TEID).

Optionally, the method may further include the following steps.

31) The first node sends, at the first protocol layer, a third message to the peer first protocol layer on the interface between the first node and the second node.

32) The second node receives, at the first protocol layer, the third message from the peer first protocol layer on the interface between the second node and the first node.

The third message includes at least one of the following information: the management information of the first connection, the first identifier, and the second identifier; the first connection is the logical connection that is on the interface between the first node and the second node and that is based on the peer first protocol layer.

It may be understood that all information in the third node is downlink information.

Specifically, the management information of the first connection in the third message may include at least one of the following information: a first connection establishment response (including, for example, a list of cells that need to be activated by the second node, that is, physical cell identifiers (PCI) of the cells that need to be activated), a new radio cell global identifier (NCGI)), a first connection establishment failure (including, for example, a failure indication, a failure cause, and a waiting time), the first connection reset (including, for example, a reset indication, a reset cause, and a list of first connections that need to be reset, where the list of first connections includes, for example, all the first connections on the interface between the first node and the second node, or the first connection of the UE indicated by using the first identifier and/or the second identifier of the UE), the first connection reset acknowledgment (including, for example, the list of the first connections that are acknowledged to be reset), the error detection indication (including, for example, an error indication, the first connection of the UE that is indicated by using the first identifier and/or the second identifier of the UE, the error cause, and the like), a second node configuration update acknowledgment (including, for example, a configuration update acknowledgment indication, a list of cells that need to be activated, that is, PCIs and/or NCGIs of the cells that need to be activated), a second node configuration update failure (including, for example, a configuration update failure indication, a cause, and a waiting time), a first node configuration update (including a list of activated/deactivated cells, that is, physical cell identifiers PCIs and/or global cell identifiers NCGIs of the cells that need to be activated/deactivated), RRC information sent by the first node to the second node, and the like.

It should be noted that the reset indication may be implicitly indicated by using a message type.

Optionally, the control-plane protocol layer further includes a peer second protocol layer with the third node on an interface between the first node and the third node; and if the first node is the donor base station, the RN, or the distributed unit of the donor base station, the control-plane protocol layer includes, from top to bottom, the peer first protocol layer with the second node on the interface between the first node and the second node, and the peer second protocol layer, a peer RLC layer, a peer MAC layer, and a peer PHY layer with the third node on the interface between the first node and the third node; or if the first node is the centralized unit of the donor base station, the control-plane protocol layer includes, from top to bottom, the peer first protocol layer with the second node on the interface between the first node and the second node, and the peer second protocol layer, a peer wiredly connected link layer, and a peer wiredly connected physical layer with the third node on the interface between the first node and the third node. Correspondingly, the control-plane protocol layer in the second node further includes a peer second protocol layer with the third node on an interface between the second node and the third node: and if the first node is the donor base station, the RN, the distributed unit of the donor base station, or the centralized unit of the donor base station, the control-plane protocol layer in the second node includes, from top to bottom, the peer first protocol layer with the first node on the interface between the second node and the first node, and the peer second protocol layer, a peer RLC layer, a peer MAC layer, and a peer PHY layer with the third node on the interface between the second node and the third node; or if the first node is the centralized unit of the donor base station, the control-plane protocol layer in the second node includes, from top to bottom, the peer first protocol layer with the first node on the interface between the second node and the first node, and the peer second protocol layer, a peer wiredly connected link layer and a peer wiredly connected physical layer with the third node on the interface between the second node and the third node.

In this case, if the first node is the donor base station, the RN, or the distributed unit of the donor base station, the control-plane protocol layer in the third node includes a peer second protocol layer, a peer RLC layer, a peer MAC layer, and a peer PHY layer with the first node on the interface between the third node and the first node. The control-plane protocol layer in the third node further includes a peer second protocol layer, a peer RLC layer, a peer MAC layer, and a peer PHY layer with the second node on the interface between the third node and the second node. Alternatively, if the first node is the centralized unit of the donor base station, the control-plane protocol layer in the third node includes the peer second protocol layer, a peer wiredly connected link layer, and a peer wiredly connected physical layer with the first node on the interface between the third node and the first node. The control-plane protocol layer in the third node further includes the peer second protocol layer, a peer RLC layer, a peer MAC layer, and a peer PHY layer with the second node on the interface between the third node and the second node. Alternatively, if the first node is the centralized unit of the donor base station, the control-plane protocol layer in the third node includes the peer second protocol layer, a peer wiredly connected link layer, and a peer wiredly connected physical layer with the first node on the interface between the third node and the first node. The control-plane protocol layer in the third node further includes the peer second protocol layer, a peer wiredly connected link layer, and a peer wiredly connected physical layer with the second node on the interface between the third node and the second node.

The method further includes the following steps.

41) The first node performs, at the second protocol layer, at least one of the following processing on the first message: adding routing information for the first message, adding a data packet type identifier for the first message, and adding a bearer identifier of a first interface for the first message, where the first interface is a communications interface between the third node and the second node.

For explanations related to the routing information and the data packet type identifier, refer to the foregoing descriptions. Details are not described herein again. The bearer identifier of the first interface is used by the third node to determine the bearer, the logical channel, the RLC channel, or the RLC bearer on which the first message is sent.

42) The first node sends, at the second protocol layer to the peer second protocol layer on the interface between the first node and the third node, the first message processed by the first node at the second protocol layer.

Optionally, before step 42), the method may further include: determining, by the first node at the second protocol layer, an RB, a logical channel, an RLC channel, or an RLC bearer on which the first message processed by the first node at the second protocol layer is sent. In this case, step 42) may include: sending, by the first node at the second protocol layer to the peer second protocol layer on the interface between the first node and the third node on the determined RB, logical channel, RLC channel, or RLC bearer, the first message processed by the first node at the second protocol layer.

43) The third node receives, at the second protocol layer from the peer second protocol layer on the interface between the third node and the first node, the first message processed by the second protocol layer in the first node.

44) The third node obtains, at the second protocol layer, at least one of the routing information of the first message, the bearer identifier of the first interface of the first message, and the data packet type identifier of the first message.

45) The third node performs, at the second protocol layer, at least one of the following processing on the first message: adding the routing information for the first message, and adding the data packet type identifier for the first message.

It should be noted that, if the third node has only a function of forwarding an F1AP message, after obtaining the data packet type identifier, the third node may add the data packet type identifier for the first message. The routing information added by the third node for the first message may be the same as or different from the routing information added by the first node for the first message. For example, the first node may add the identifiers of the first node and the second node to the first message. After obtaining the identifier added by the first node for the first message, the third node may remove the identifiers of the first node and the second node that are added by the first node, and then add identifiers of the third node and the second node for the first message. In this case, the routing information added by the first node to the first message is different from the routing information added by the third node to the first message. In another possible example, the first node may add the identifiers of the first node and the second node for the first message; after obtaining the identifier added by the first node for the first message, the third node determines that the first message needs to be sent to the second node, and the third node may still add the identifiers of the first node and the second node for the first message (or does not change the routing information added by the first node). In this case, the routing information added by the first node for the first message is the same as the routing information added by the third node for the first message.

46) The third node sends, at the second protocol layer to the peer second protocol layer on the interface between the third node and the second node, the first message processed by the second protocol layer in the third node.

Specifically, the second protocol layer in the third node obtains the routing information of the first message, and the third node routes, at the second protocol layer based on the routing information of the first message, the first message processed by the second protocol layer in the third node: and/or the second protocol layer in the third node obtains the bearer identifier of the first interface, and the second protocol layer in the third node sends, based on the bearer identifier of the first interface on a bearer, a logical channel, an RLC channel, or an RLC bearer corresponding to the first interface, the first message processed by the second protocol layer in the third node.

47) The second node receives, at the second protocol layer from the peer second protocol layer on the interface between the second node and the third node, the first message processed by the second protocol layer in the third node.

48) The second node obtains, at the second protocol layer, at least one of the routing information of the first message and the data packet type identifier of the first message.

After step 48), if the second node obtains the routing information of the first message at the second protocol layer, the second node routes the first message at the second protocol layer based on the routing information of the first message.

If the second protocol layer in the second node determines that the second node is a destination node of the first message, the second node obtains the data packet type identifier of the first message at the second protocol layer, and the data packet type identifier of the first message indicates that the first message is a first protocol layer message, the second node sends, at the second protocol layer, the first message to the first protocol layer in the second node, and the second node may obtain, at the first protocol layer, information included in the first message.

It should be noted that, if a node determines, based on routing information of a message, that the node is a destination node of the message, the node does not forward the message: or if the node determines that the node is not a destination node of the message, the node routes the message based on information included in the routing information.

In this embodiment of this application, the second node may be an agent node (for example, the RN 2 in FIG. 18) of an F1 connection, to be specific, an F1 connection still exists between the second node and another node. Assuming that the second node is used as an agent node between the first node and a fourth node, the second node further needs to perform the following processing.

(1) The second node allocates a first connection identifier to the UE, where the first connection identifier is denoted as a node 2 UE F1AP ID. Before an uplink F1AP message is forwarded, the node 2 UE F1AP ID is added to the F1AP message. For example, a first connection identifier (denoted as a node 4 UE F1AP ID) allocated by the fourth node to the UE in the F1AP message is replaced with the node 2 UE F1AP ID. Before a downlink F1AP message is forwarded, the node 2 UE F1AP 1D is added to the F1AP message. For example, a first connection identifier (denoted as a node 1 UE F1AP ID) allocated by the first node to the UE in the F1AP message is replaced with the node 2 UE F1AP ID.

(2) When the second node receives, from the first node, a UL TEID (denoted as a node 1 UL TEID) configured by the first node for the GTP tunnel of the UE at the F1 connection, a UL TEID (denoted as a node 2 UL TEID) on the second node that is in a one-to-one correspondence with the UL TEID (denoted as the node 1 UL TEID) may be allocated. The second node maintains a mapping relationship between the node 1 UL TEID and the node 2 UL TEID, and adds the node 2 UL TEID to the F1AP message and configures the F1AP message for the fourth node.

When the second node receives, from the fourth node, a DL TEID (denoted as a node 4 DL TEID) configured by the fourth node for the GTP tunnel of the F1 connection of the UE, a DL TEID (denoted as a node 2 DL TEID) on the second node that is in a one-to-one correspondence with the DL TEID (denoted as the node 4 UL TEID) may be allocated. The second node maintains a mapping relationship between the node 4 DL TEID and the node 2 DL TEID, and adds the node 2 DL TEID to the F1AP message and returns the F1AP message to the first node.

The node 2 UL TEID and the node 2 DL TEID that are allocated by the second node may be a same tunnel endpoint identifier, or may be different tunnel endpoint identifiers.

In this case, an uplink tunnel endpoint identifier included in an uplink user plane data packet of the UE that is sent by the fourth node to the second node is the node 2 UL TEID. Before sending the uplink user plane data packet of the UE to the first node, the second node replaces the uplink tunnel endpoint identifier node 2 UL TEID in the uplink user plane data packet with the node 1 UL TEID allocated by the first node to the UE. A downlink tunnel endpoint identifier included in a downlink user plane data packet of the UE that is sent by the first node to the second node is the node 2 DL TEID. Before sending the downlink user plane data packet of the UE to the fourth node, the second node replaces the downlink tunnel endpoint identifier node 2 DL TEID in the downlink user plane data packet with the node 4 DL TEID allocated by the fourth node to the UE, so that the first node and the fourth node identify a terminal and/or a DRB of a terminal corresponding to the data packet.

In addition, to ensure information security, security protection may be performed on the F1AP message. For a specific implementation of the security protection, refer to the foregoing related descriptions. Details are not described herein again.

In the control-plane protocol layer architecture provided in this embodiment of this application, the F1 connection needs to be established, and an attach procedure of the terminal changes. Therefore, the following further describes F1 connection establishment, configuration, and update, and an attach procedure of the terminal by using several different control-plane protocol layer architectures as examples. Embodiment 1 is a process of the F1 connection establishment, configuration, and update, and Embodiment 2 is the attach procedure of the terminal. In these embodiments, an example in which the terminal is the UE and the method is applied to a 5G network is used for description.

Embodiment I

This embodiment is based on the control-plane protocol layer architecture shown in FIG. 9. A first node is a DgNB, and a second node is an RN 1. An F1 connection is established only between the DgNB and the RN 1.

Embodiment 1

Figure 20:
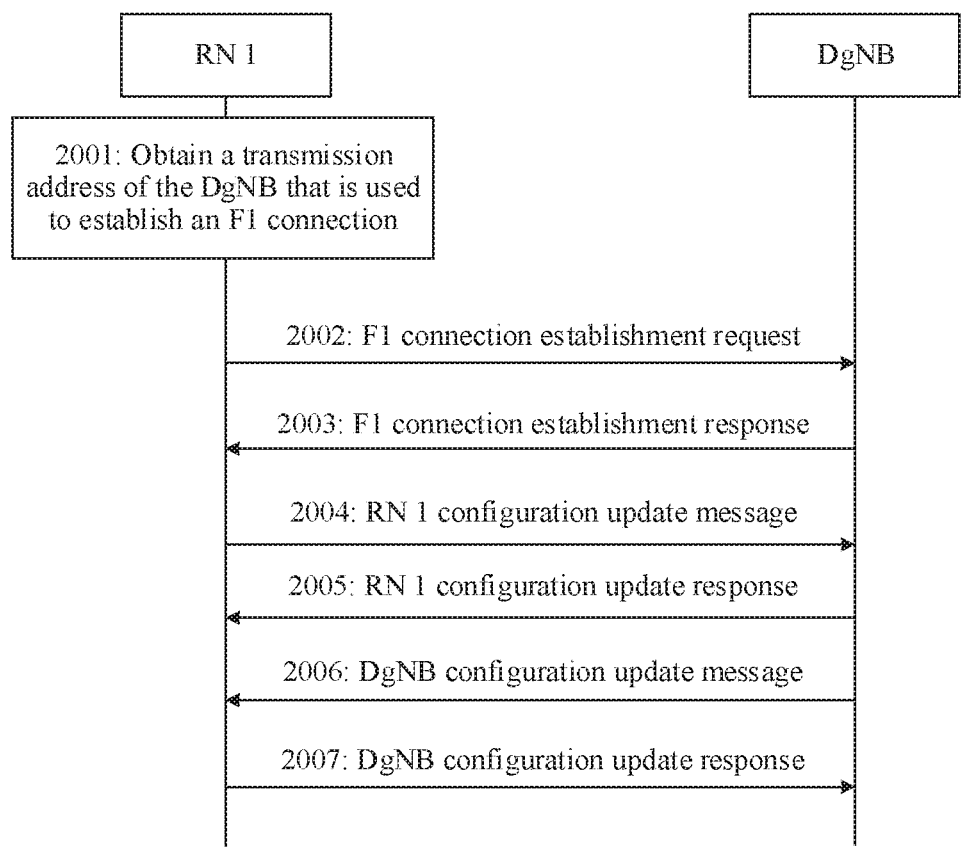
FIG. 20 is a schematic diagram of an F1 connection establishment process according to an embodiment of this application.

As shown in FIG. 20, the method may include the following steps.

2001: The RN 1 obtains a transport address that is of the DgNB and that is used to establish the F1 connection.

Before step 2001, the RN 1 may be attached to a network as UE.

The transport address may be a transport network layer (TNL) address, such as an IP address, or may be another address that can be identified by a second protocol layer, such as a globally unique node identifier of the DgNB or a locally unique identifier allocated by the DgNB.

Step 2001 may be implemented in any one of the following manners during specific implementation.

Manner 1: Configuration information is obtained from an operation, administration and maintenance entity (OAM). The configuration information includes the transport address of the DgNB, and the configuration information may further include a transport address of the RN 1.

Manner 2: The DgNB sends the transport address of the DgNB to the RN 1 by sending an RRC reconfiguration message to the RN 1. It should be noted that, to obtain the transport address of the DgNB, the RN 1 may send the DgNB a message including information about an identity indicating that the RN 1 is an RN.

2002: The RN 1 sends an F1 connection establishment request to the DgNB based on the transport address.

The F1 connection establishment request is used to request to establish the F1 connection between the DgNB and the RN 1, and the F1 connection establishment request is an F1AP message.

The F1 connection establishment request may include at least one of the following information: an RN 1 ID, information about a cell served by the RN 1, system information of the cell served by the RN 1, and the like. The information about the cell served by the RN 1 includes information such as an NCGI, a PCI, a PLMN identifier, and NR mode selection. For details, refer to related descriptions of cell information of a DU in the NR standard TS38.473. The DU in the standard may be replaced with the RN 1 for understanding. The system information of the cell served by the RN 1 includes a master information block (MIB) and a first system information block (SIB) (which may be represented as a SIB 1). For specific content included in the MIB and the SIB 1, refer to the prior art.

2003: The DgNB sends an F1 connection establishment response to the RN 1.

The F1 connection establishment response is used to indicate whether the F1 connection is successfully established, and the F1 connection establishment response is an F1AP message.

If the F1 connection establishment response indicates that the F1 connection is successfully established, the F1 connection establishment response may include information about a cell (including an NCGI and/or a PCI) that can be activated by the RN 1. If the F1 connection establishment response indicates that the F1 connection establishment fails, the F1 connection establishment response may include a failure cause.

If the F1 connection establishment response indicates that the F1 connection is successfully established, the method may further include the following step 2004 to step 2007.

2004: The RN 1 sends an RN 1 configuration update message to the DgNB.

The RN 1 configuration update message is used to notify the DgNB of information about a cell that needs to be added, modified, or deleted by the RN 1 (for example, including an identifier of the cell such as an NCGI and/or a PCI, a PLMN, a duplex mode, bandwidth, and a system message of the RN 1).

2005: The DgNB sends an RN 1 configuration update response to the RN 1.

The RN 1 configuration update response is used to indicate whether RN 1 configuration update succeeds. For example, if the RN 1 configuration update response is used to indicate that configuration update at the DgNB succeeds, the RN 1 configuration update response message includes information about a cell of the RN 1 that needs to be activated (including an NCGI and/or a PCI). Alternatively, if the RN 1 configuration update response is used to indicate that configuration update at the DgNB fails, information such as a failure cause and a required waiting time may be included.

2006: The DgNB sends a DgNB configuration update message to the RN 1.

The DgNB configuration update message is used to indicate, to the RN 1, the information about the cell that needs to be activated (including, for example, the NCGI and/or the PCI of the cell that needs to be activated) and/or information about a cell that needs to be deactivated (including, for example, an NCGI and/or a PCI of the cell that needs to be deactivated).

2007: The RN 1 sends a DgNB configuration update response to the DgNB.

The DgNB configuration update response is used by the RN 1 to indicate to the DgNB whether configuration update on the RN 1 succeeds. For example, if the DgNB configuration update response is used to indicate that configuration update on the RN 1 succeeds, the DgNB configuration update response message may include information about a cell of the RN 1 that fails to be activated (including an NCGI and/or a PCI) and an activation failure cause. Alternatively, if the RN 1 configuration update response is used to indicate that configuration update on the RN 1 fails, information such as a failure cause and a required waiting time may be included.

Embodiment 2

After the F1 connection is established between the RN 1 and the DgNB, the UE may send, based on the received system information of the RN 1, a preamble to the RN 1 to initiate a random access request, the RN 1 returns a random access response to the UE, and then the UE sends an RRC connection request to the RN 1. The following describes an RRC connection establishment process between the UE and the DgNB and a UE context configuration process in a packet data unit (PDU) session establishment process of the UE by using steps. The UE needs to be attached to the network by using the RN 1. The following describes the process in detail.

Figure 21:
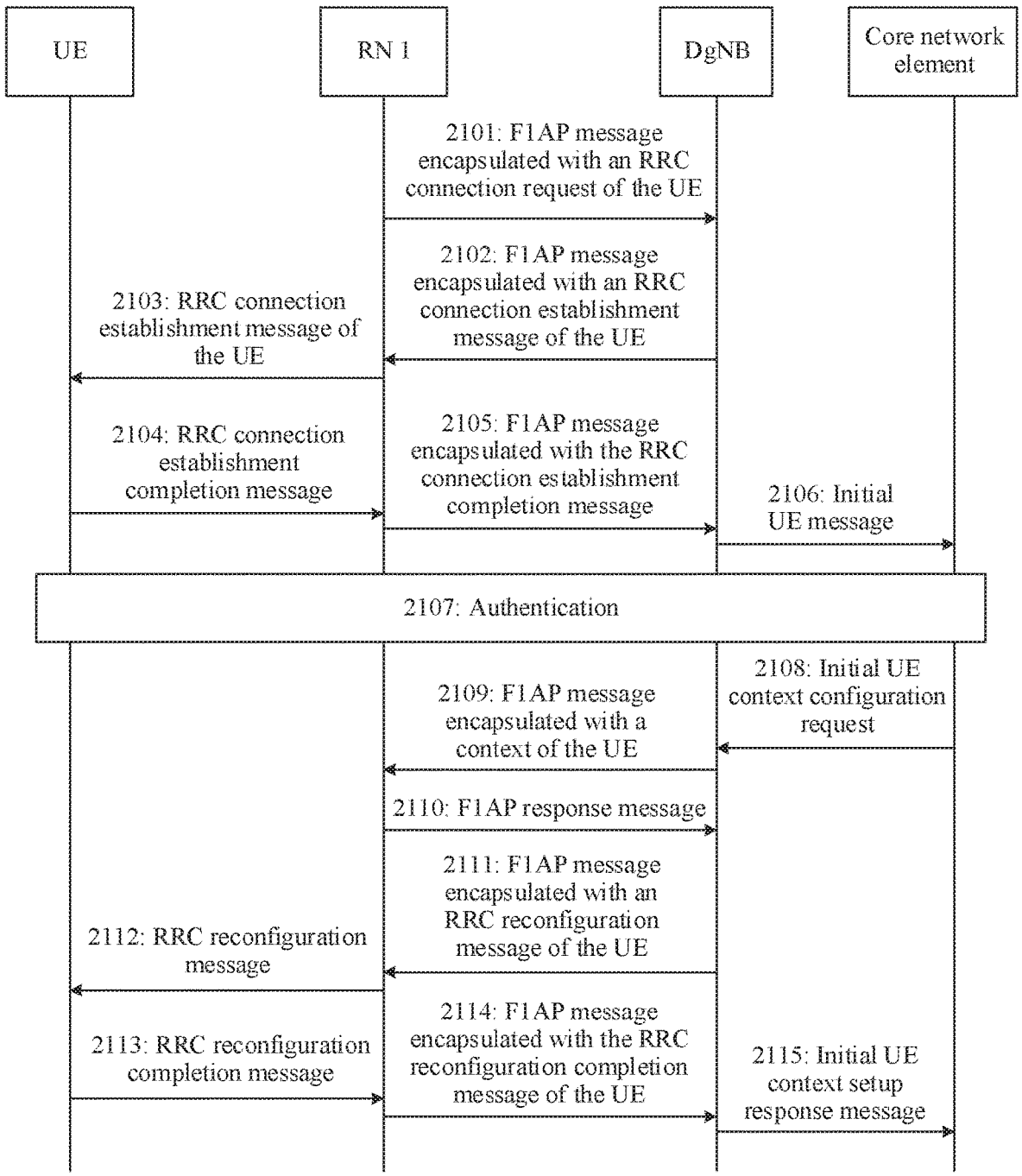
FIG. 21 is a schematic diagram of a process of attaching UE to a network according to an embodiment of this application.

As shown in FIG. 21, the method may include the following steps.

2101: The RN 1 sends, to the DgNB, an F1AP message encapsulated with an RRC connection request of the UE.

The RRC connection request of the UE may be specifically encapsulated in an RRC message container of the F1AP message, and a type of the F1AP message encapsulated with the RRC connection request of the UE may be an initial uplink RRC transfer message (initial uplink RRC message transfer).

The F1AP message encapsulated with the RRC connection request of the UE may include an F1 interface identifier allocated by the RN 1 to the UE, and for example, the F1 interface identifier may be denoted as an RN 1 UE F1AP ID. After receiving the information, the DgNB may store the information.

2102: The DgNB sends, to the RN 1, an F1AP message encapsulated with an RRC connection establishment message of the UE.

The RRC connection establishment message of the UE may be encapsulated in an RRC message container of the F1AP message, and a type of the F1AP message encapsulated with the RRC connection establishment message of the UE may be a downlink RRC transfer message (DL RRC message transfer).

The F1AP message encapsulated with the RRC connection establishment message of the UE may include an F1 interface identifier allocated by the DgNB to the UE, and for example, the F1 interface identifier may be denoted as a DgNB UE F1AP ID.

2103: After receiving the F1AP message that is encapsulated with the RRC connection establishment message of the UE and that is sent by the DgNB, the RN 1 extracts the RRC connection establishment message of the UE from the F1AP message, and sends the RRC connection establishment message of the UE to the UE.

In addition, the RN 1 further stores the F1 interface identifier allocated by the DgNB to the UE in the F1AP message.

After step 2103, the F1AP message that is related to the UE and that is exchanged between the RN 1 and the DgNB may include the RN 1 UE F1AP ID and the DgNB UE F1AP ID, so that the RN 1 and the DgNB can identify the UE corresponding to the F1AP message.

2104: After performing corresponding configuration according to an indication of the RRC connection establishment message, the UE sends an RRC connection establishment completion message to the RN 1.

The RRC connection establishment completion message may include the first uplink non-access stratum (NAS) message.

2105: The RN 1 sends, to the DgNB, an F1AP message encapsulated with the RRC connection establishment completion message.

2106: The DgNB sends an initial UE message to a core network element.

For example, the core network element may be an access and mobility management function (AMF) network element. The initial UE message is used to request establishment of an NG connection related to the UE.

2107: Mutual authentication is performed between the network and the UE.

The UE may perform authentication and authorization with a core network element such as an authentication server function (AUSF) or a unified data management function (UDM) to complete a registration process, or interact with a device that has authentication and authorization functions in a data network (DN) (for example, an authentication, authorization, and accounting server) to complete authentication. A plurality of pieces of signaling are exchanged in an authentication process. For an authentication process, refer to the prior art. Details are not described herein.

2108: The core network element sends an initial UE context configuration request (initial UE context setup request) to the DgNB.

The initial UE context configuration request is used to notify the DgNB to establish a context of the UE.

2109: The DgNB sends, to the RN 1, an F1AP message encapsulated with the context of the UE.

Context information of the UE may include at least one of the following content: a list of UE RBs (the RB may be an SRB and/or a DRB) that need to be established, a list of RN 1 RBs (that is, an RB between the RN 1 and the DgNB, including an SRB and/or a DRB) that need to be established, an identifier of a UE QoS flow, a QoS parameter configuration of the UE QoS flow, a mapping relationship between the UE QoS flow and the UE RB, a mapping relationship between the UE RB/QoS flow and the RN 1 RB, and an endpoint identifier of a GTP tunnel corresponding to a UE DRB on the DgNB; that is, an uplink endpoint identifier of the GTP tunnel. The list of UE RBs that need to be established includes at least one of the following content: a UE SRB ID, a parameter of a UE SRB, a UE DRB ID, and a QoS parameter of a UE DRB. The list of RN 1 RBs that need to be established includes at least one of the following content: an RN 1 SRB ID, a parameter of an RN 1 SRB, an RN 1 DRB ID, and a QoS parameter of an RN 1 DRB.

2110: The RN 1 sends an F1AP response message to the DgNB.

The F1AP response message is used to indicate that UE context setup is completed. The F1AP response message may further include a list of RBs that have been established by the RN 1, and an endpoint identifier of the GTP tunnel corresponding to the UE DRB on the RN 1, that is, a downlink endpoint identifier of the GTP tunnel.

2111: The DgNB sends, to the RN 1, an F1AP message encapsulated with an RRC reconfiguration message of the UE, where the RRC reconfiguration information may include configuration information of an RB of the UE (including, for example, a UE DRB ID and a DRB QoS parameter) and information related to the UE QoS flow (including, for example, a QoS flow identifier and a QoS flow parameter).

In another optional manner, the RRC reconfiguration message of the UE may be included in the F1AP message that is encapsulated with the context of the UE in step 2109 and that is sent by the DgNB to the RN 1.

2112: The RN 1 sends the RRC reconfiguration message to the UE.

2113: After completing RRC reconfiguration, the UE sends an RRC reconfiguration completion message to the RN 1.

2114: The RN 1 sends, to the DgNB, an F1AP message encapsulated with the RRC reconfiguration completion message of the UE.

The RRC reconfiguration completion message may be encapsulated in an RRC container in the F1AP message.

In another optional manner, the RRC reconfiguration completion message of the UE may be included in the F1AP response message sent by the RN 1 to the DgNB in step 2110. In this case, step 2112 and step 2113 are between step 2009 and step 2110.

In this embodiment of this application, the RRC reconfiguration completion message of the UE and the context setup completion message of the UE may be included in an F1AP message, and the F1AP message is sent by the RN 1 to the DgNB (or a CU). The RRC reconfiguration message of the UE and the context of the UE may be included in an F1AP message, and the F1AP message is sent by the DgNB (or a CU) to the RN 1.

2115: The DgNB sends an initial UE context setup response message to the core network element.

The initial UE context setup response message is used to indicate that a PDU session of the UE and a corresponding context have been configured on a RAN side.

In this embodiment, based on the control-plane protocol layer architecture in this embodiment of this application, the F1 connection is established between the RN 1 and the DgNB. A context configuration of the UE on the RN 1 is generated by the DgNB, and then the F1AP message is generated and sent to the RN 1. A downlink RRC message of the UE is also generated by the DgNB and is carried in the F1AP message, the F1AP message is sent to the RN 1, and then the RN 1 extracts an RRC message from the F1AP message and sends the RRC message to the UE.

Embodiment 1

This embodiment is based on the control-plane protocol layer architecture shown in FIG. 15. A first node is a DgNB, a second node is an RN 1, and a third node is an RN 2. An F1 connection is established only between the DgNB and the RN 1. The RN 2 does not parse an F1AP message, and only performs routing and forwarding.

Embodiment 1

Figure 22:
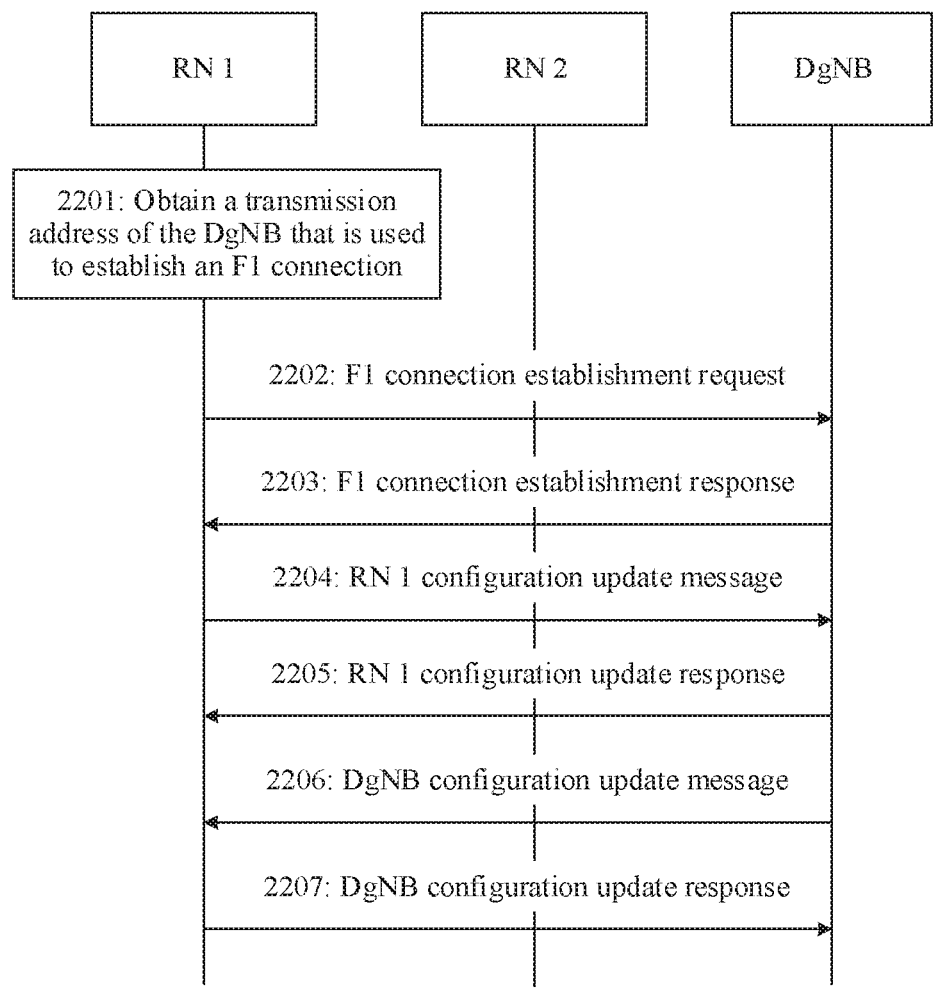
FIG. 22 is a schematic diagram of another F1 connection establishment process according to an embodiment of this application.

For the method, refer to the method described in Embodiment 1 of Embodiment I. Referring to FIG. 22, FIG. 22 includes step 2201 to step 2207, and a difference between any one of step 2201 to step 2207 and the corresponding step 2001 to step 2007 lies in that: Information exchanged between the RN 1 and the DgNB is forwarded by the RN 2. In addition, before the RN 1 accesses a network, the RN 2 establishes a connection to the DgNB, and the RN 1 is attached to the network as UE.

In this embodiment of this application, a corresponding step is a step at a same location in a plurality of steps. For example, step 2203 is the third step in step 2201 to step 2207, and step 2003 is the third step in step 2001 to step 2007. Therefore, step 2203 and step 2003 are corresponding steps.

Embodiment 2

For the method, refer to the method in Embodiment 2 of Embodiment 1. A difference is that information exchanged between the RN 1 and the DgNB is forwarded by the RN 2. In addition, before the RN 1 accesses a network, the RN 2 establishes a connection to the DgNB, and the RN 1 may be attached to the network as UE.

For the RN 2, the DgNB may send configuration information (for example, an RRC reconfiguration message or an F1AP message sent to the RN 2) to the RN 2, and send some UE context information to the RN 2.

Some UE context information may include at least one of the following content: an identifier of the UE, an identifier of the RN 1 that serves the UE, a routing rule of a data packet of the UE, a QoS requirement at a granularity of an RB or a QoS flow of the UE (which may be a QoS parameter corresponding to a DRB of the UE, or a QoS parameter corresponding to a QoS flow of the UE), a rule for performing QoS mapping on a data packet of the UE on the RN 2, or the like.

The rule for performing QoS mapping on the data packet of the UE on the RN 2 may include at least one of the following mapping rules: mapping from a UE RB/QoS flow to an RB between the RN 2 and the DgNB, mapping from the UE RB/QoS flow to an RB between the RN 1 and the RN 2, a mapping relationship between an RB of an RN 2-RN 1 interface and an RB of an RN 2-DgNB interface, and the like.

The configuration information may further include information about a bearer that needs to be established, including at least one of the following information: an RB of an RN 2-RN 1 interface that needs to be established, a QoS parameter corresponding to each RB of an RN 2-RN 1 interface that needs to be established, an RB of an RN 2-DgNB interface that needs to be established, and a QoS parameter corresponding to each RB of an RN 2-DgNB interface that needs to be established.

Figure 23:
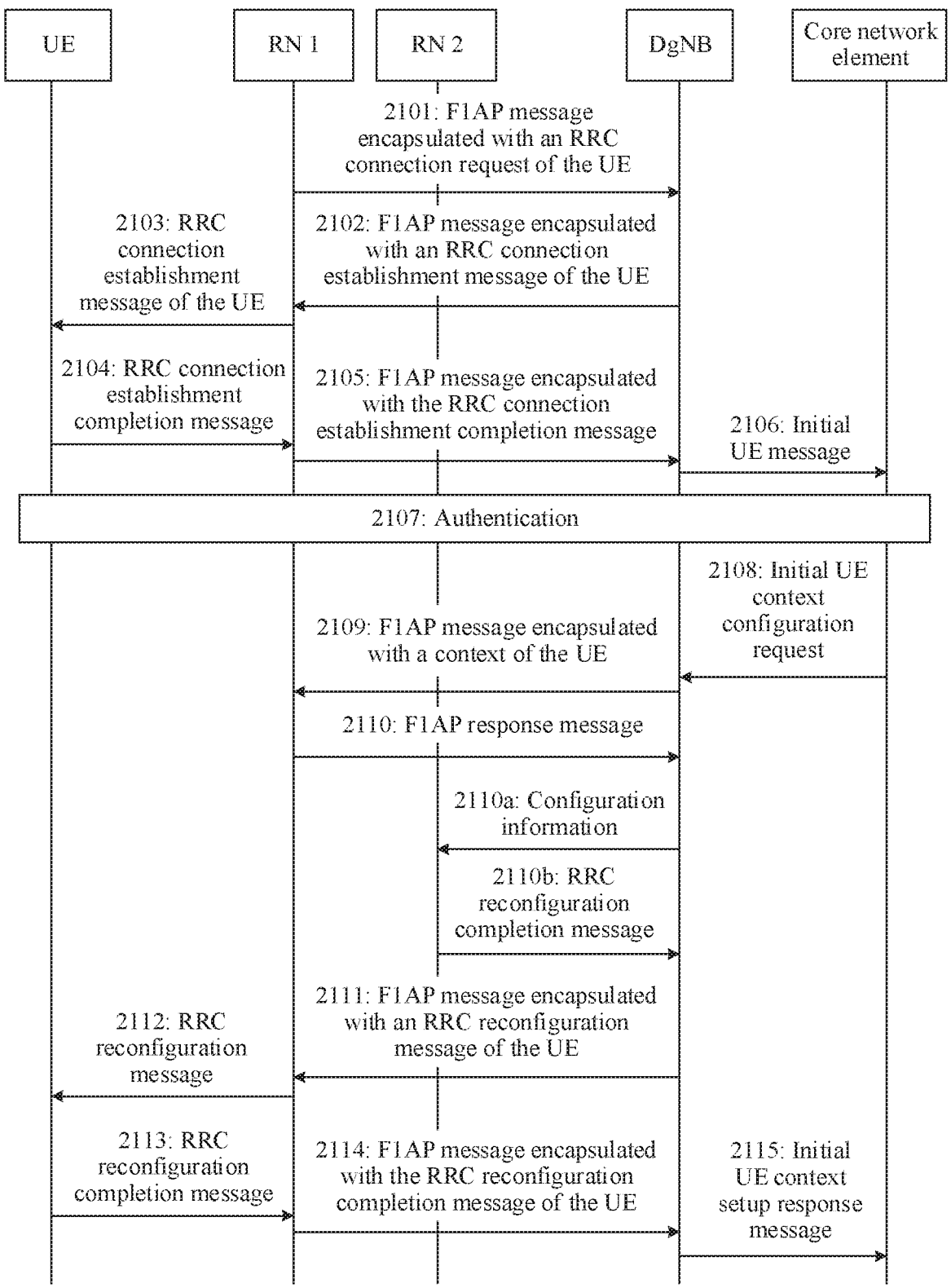
FIG. 23 is a schematic diagram of another process of attaching UE to a network according to an embodiment of this application.

In this case, referring to FIG. 23, based on FIG. 21, optionally, step 2110a may be added: The DgNB sends the configuration information to the RN 2. Correspondingly, after configuration is completed, referring to step 2110b, the RN 2 sends, to the DgNB, a message used to acknowledge that the configuration is completed, such as an RRC reconfiguration completion message or an F1AP message. The accompanying drawings of the embodiments of this application are drawn by using an example in which a message used for acknowledging configuration completion is an RRC reconfiguration completion message.

A sequence of step 2110, step 2110a, and step 2110b is not limited in this embodiment of this application.

By using the technical solution in this embodiment, in a multi-hop relay scenario, the DgNB may perform management configuration of an RN cell, configuration of a UE context, and sending of an RRC message of the UE by using an F1AP message. An intermediate RN does not need to parse an F1AP message of another RN, and only needs to perform routing and forwarding. Therefore, when a topology changes, flexible adaption may reduce unnecessary configuration update.

Embodiment III

In NR, a gNB may be in a form in which a CU and a DU are separated. An F1 connection is established between a gNB-CU and a gNB-DU, a cell of the gNB-DU may be managed and configured based on the established F1 connection, and UE-related configuration may be performed based on the established F1 connection. Based on this scenario, this embodiment is based on the control-plane protocol layer architecture shown in FIG. 16, and the DgNB is in a form in which a CU and a DU are separated. An RN 2 does not parse an F1AP message, and only needs to perform routing and forwarding. In this embodiment, a role of the DU is similar to that of the RN 2 in Embodiment II, and the DU does not parse an F1AP message on an F1 interface between the DgNB and an RN 1, and only performs routing and forwarding.

Embodiment 1

Figure 24:
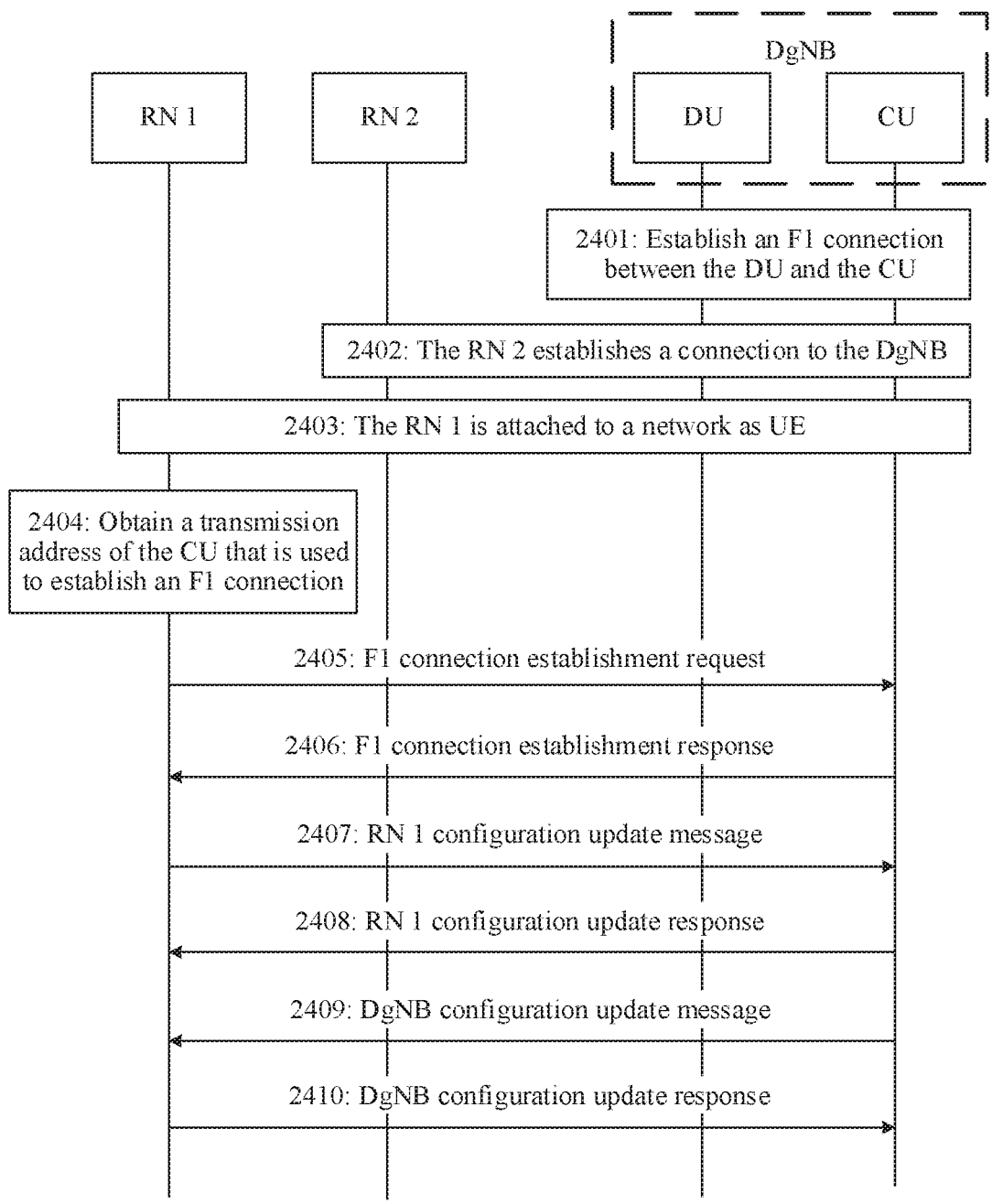
FIG. 24 is a schematic diagram of another F1 connection establishment process according to an embodiment of this application.

In this embodiment, for a procedure of establishing an F1 connection between the RN 1 and a DgNB-CU, refer to Embodiment 1 of Embodiment I. Referring to FIG. 24, FIG. 24 includes step 2401 to step 2410.

Because the DgNB is internally classified into a DgNB-DU (referred to as DU for short below) and the DgNB-CU (referred to as CU for short below), the method may include the following steps.

2401: An F1 connection is established between the DU and the CU. After connection establishment is completed, the DU is considered as an intermediate forwarding node other than the RN 2, and forwards, between the RN 1 and the CU, an F1AP message (including a message related to establishment of the F1 connection and a configuration update message) between the RN 1 and the CU.

2402: The RN 2 establishes a connection to the DgNB.

2403: The RN 1 is attached to a network as UE.

2404: A difference from step 2001 lies in that the RN 1 obtains a transport address of the CU.

Differences between any step in step 2405 to step 2410 and a corresponding step in step 2002 to step 2007 lie in that a message is transmitted between the RN 1 and the CU and the message is forwarded by the DU and the RN 2.

In this embodiment, the CU may be considered as a role of the DgNB in Embodiment 1 of Embodiment I, and may establish and maintain an F1 connection between the RN 1 and the CU, and provide configuration information for the RN.

Embodiment 2

Figure 25A:
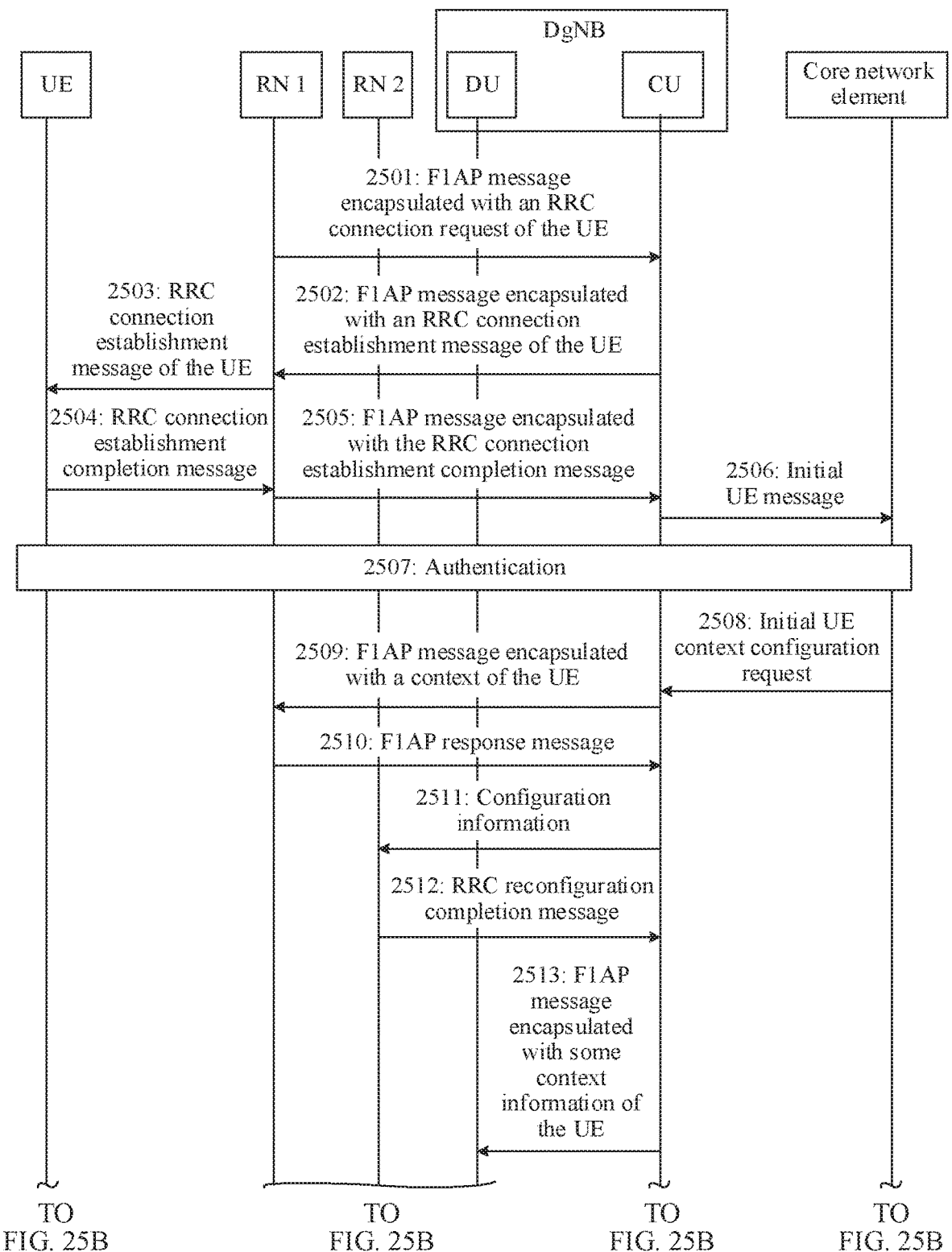
FIG. 25A and FIG. 25B are a schematic diagram of another process of attaching UE to a network according to an embodiment of this application.
Figure 25B:
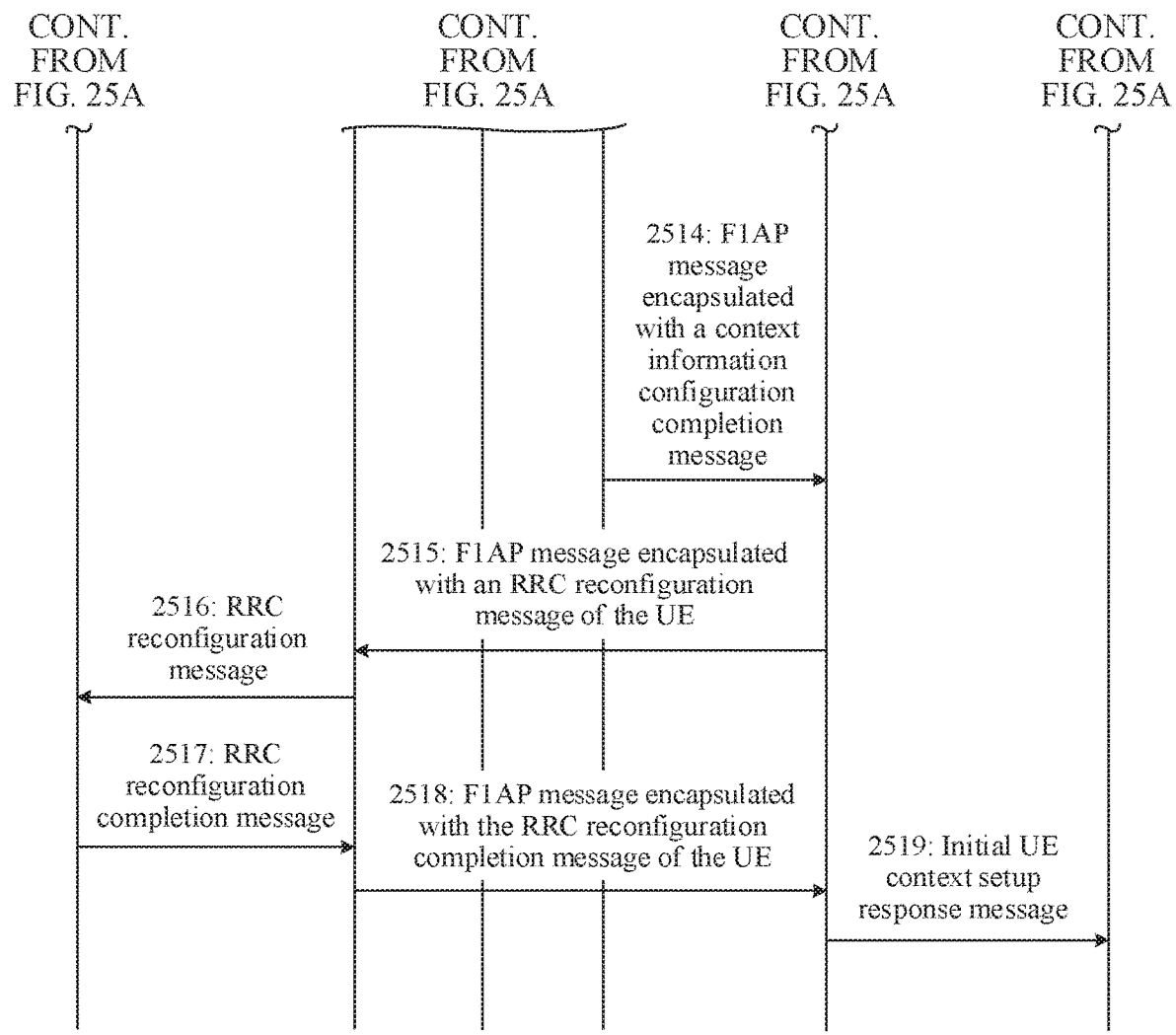

In this embodiment, a UE attach procedure is similar to the process in Embodiment 2 of Embodiment I. Referring to FIG. 25A and FIG. 25B, FIG. 25A and FIG. 25B include step 2501 to step 2519.

The DgNB in Embodiment 2 of Embodiment II includes a CU and a DU in this embodiment. Therefore, the CU in this embodiment may be considered as a role of the DgNB in Embodiment 2 of Embodiment II, and the method may include the following steps.

A difference between any step in step 2501 to step 2510 and a corresponding step in step 2101 to step 2110 lies in that a message between the RN 1 and the CU is forwarded by the DU and the RN 2.

2511: Same as 2110a.
2512: Same as 2110b.

In addition to sending an RRC reconfiguration message to the RN 2, the CU further needs to send an F1AP message to the DU, to send some UE context information to the DU. Therefore, the method may further include the following steps.

2513: The CU sends, to the DU, an F1AP message encapsulated with some UE context information.

Some UE context information may include at least one of the following content: an identifier of the UE, an identifier of the RN 1 that serves the UE, a routing rule of a data packet of the UE, a QoS requirement at an RB granularity or a QoS flow granularity of the UE (which may be a QoS parameter corresponding to a DRB of the UE, or a QoS parameter corresponding to a QoS flow of the UE), a rule for performing QoS mapping on a data packet of the UE on the DU, or the like. A rule for performing QoS mapping on a UE data packet on the DU may include at least one of the following mapping rules: a mapping relationship between a UE RB/QoS flow and an RB between the RN 2 and the DU. The F1AP message may further include: an RB of an RN 2-DU interface that needs to be established, and a QoS parameter corresponding to each RB of the RN 2-DU interface that needs to be established. It should be noted that the configuration content may also be separately included in different F1-AP messages, and sent by the CU to the DU.

2514: The DU sends, to the CU, an F1AP message encapsulated with a context information configuration completion message.

A sequence of step 2511 and steps 2513 and 2514, and a sequence of step 2513 and steps 2511 and 2512 are not specifically limited in this embodiment of this application.

A difference between any step in step 2515 to step 2519 and a corresponding step in step 2111 to step 2115 lies in that a message between the RN 1 and the CU is forwarded by the DU and the RN 2.

Embodiment IV

This embodiment is based on the control-plane protocol layer architecture shown in FIG. 17, and a DgNB is in a form in which a CU and a DU are separated. An RN 2 does not parse an F1AP message, and only needs to perform routing and forwarding. In this embodiment, the DU is considered as an agent role of an end-to-end F1 interface/connection between the CU and an RN 1, and may parse an F1AP message between the RN 1 and the CU and replace a UE identifier in the F1AP message before forwarding the F1AP message.

Embodiment 1

Figure 26:
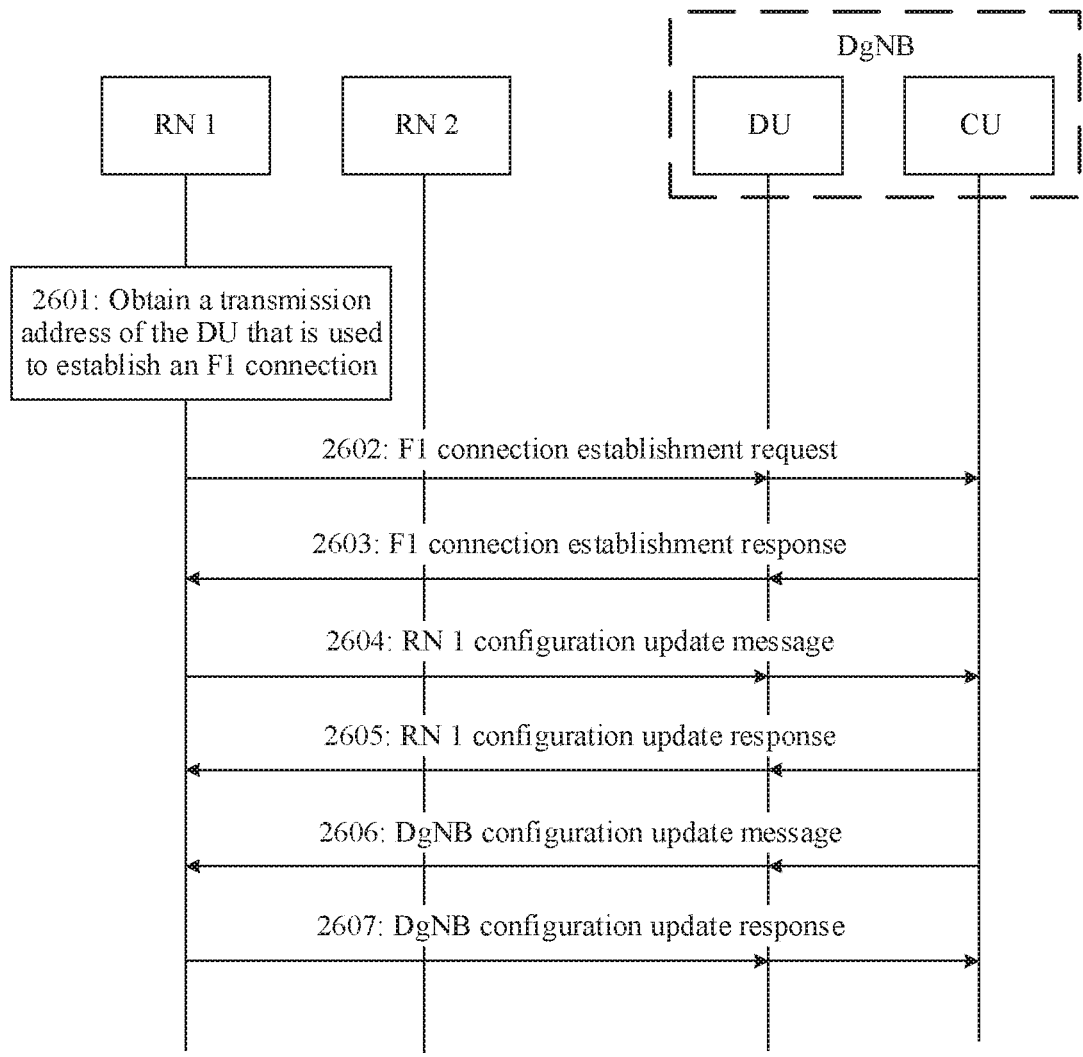
FIG. 26 is a schematic diagram of another F1 connection establishment process according to an embodiment of this application.

When a DU is used as an agent node of the F1 connection between the CU and the RN 1, the F1 connection between the RN 1 and the CU is divided into two segments, to be specific, a first segment between the RN 1 and the DU and a second segment between the DU and the CU. Therefore, as shown in FIG. 26, the method may include step 2601 to step 2607.

A difference between step 2601 and step 2001 lies in that a transport address obtained by the RN 1 is a transport address of the DU, to establish the first segment of the F1 connection. Therefore, the RN 1 may obtain transport addresses/a transport address of the CU and/or the DU by using OAM configuration information. Alternatively, the RN 1 obtains transport addresses/a transport address of the CU and/or the DU by using RRC configuration information sent by the CU. Alternatively, the RN 1 obtains a transport address of the CU by using OAM configuration information, and obtains the transport address of the DU by using RRC configuration information sent by the CU.

It should be noted that before step 2601, an F1 connection is established between the DU and the CU.

A difference between step 2602 and step 2002 lies in that the RN 1 first sends an F1 connection establishment request to the DU, and then the DU generates an F1AP message and sends some or all information in the F1 connection request to the CU. Optionally, the DU may not change content of the F1AP message that is received by the DU and that is sent by the RN 1 to the CU but directly send the F1AP message to the CU. For example, the DU may read the content of the F1AP message received by the DU from the RN 1. It is determined based on a message type (for example, a message unrelated to UE, such as an F1 connection establishment request, an RN 1 configuration update, and a CU configuration update acknowledgment or failure) in the F1AP message, that message content does not need to be changed, and the received F1AP message is directly sent to the CU.

The F1 connection request includes at least one of the following information: an RN 1 ID, an RN 1 name, RN system information, RN cell information, and the like.

A difference between step 2603 and step 2003 lies in that the CU first sends an F1 connection establishment response to the DU, and then the DU generates the F1AP message and sends the F1AP message to the RN 1. Optionally, the DU may not change content of the F1AP message that that is sent by the CU and is received by the DU but directly send the F1AP message to the RN 1. For example, the DU may read the content of the F1AP message that is received by the DU from the CU and that is sent to the RN 1. It is determined based on message type information (for example, the message type information is displayed as a message unrelated to UE, such as an F1 connection establishment response message, a CU configuration update, and an RN configuration update acknowledgment or failure) in the F1AP message, that message content does not need to be changed, and the received F1AP message is directly sent to the RN 1.

The F1AP message includes some or all information in the F1 connection establishment response message sent by the CU, for example, information (an NCGI and/or a PCI) about a cell served by the RN 1 to be activated.

A difference between any step in step 2604 to step 2607 and a corresponding step in step 2004 to step 2007 lies in that, in a process of updating an RN configuration and updating a CU configuration, the DU also forwards a corresponding F1AP message between the RN 1 and the CU.

It should be noted that in this embodiment, a message between the RN 1 and the DU is forwarded by the RN 2.

Embodiment 2

Figure 27:
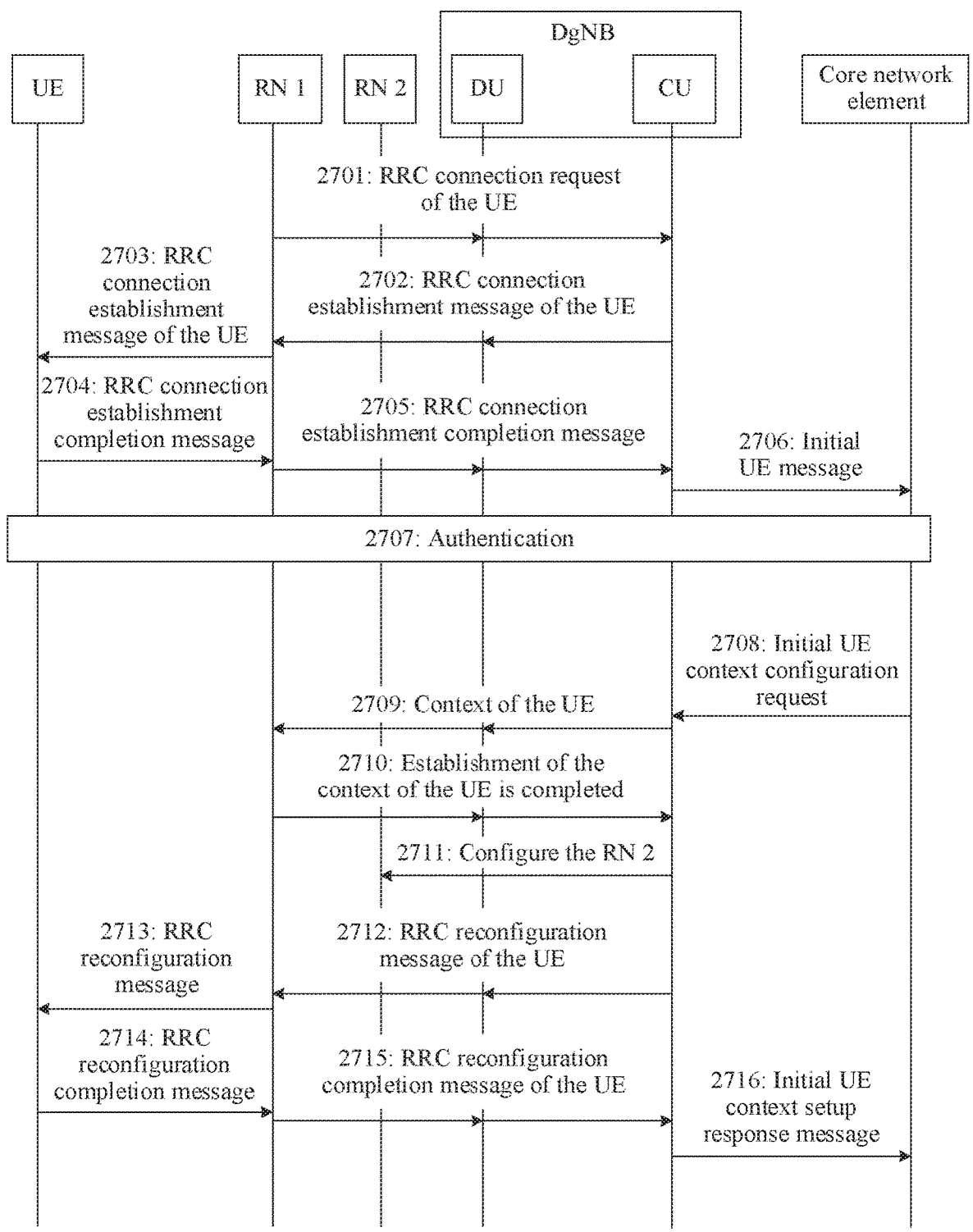
FIG. 27 is a schematic diagram of another process of attaching UE to a network according to an embodiment of this application.

In this scenario, a UE attach procedure is similar to that in Embodiment 2 in Embodiment I. Referring to FIG. 27, the method may include step 2701 to step 2716.

2701: The RN 1 transmits an RRC connection request of the UE to the CU.

This may specifically include the following steps.

(1) The RN 1 sends, to the DU, an F1AP message encapsulated with the RRC connection request of the UE.

The RRC connection request of the UE may be encapsulated in an RRC message container of the F1AP message, a type of the F1AP message encapsulated with the RRC connection request of the UE may be an initial uplink RRC transfer message (initial UL RRC message transfer), and the F1AP message encapsulated with the RRC connection request of the UE carries a first connection identifier (that is, an RN 1 UE F1AP ID) allocated by the RN 1 to the UE.

(2) After receiving the F1AP message that is encapsulated with the RRC connection request of the UE and that is sent by the RN 1, and before sending the RRC connection request of the UE to the CU, the DU allocates a first connection identifier (that is, a DU UE F1AP ID) to the UE, and replaces the RN 1 UE F1AP ID in the F1AP message with the DU UE F1AP ID. Optionally, the DU stores a correspondence between the RN 1 UE F1AP ID and the DU UE F1AP ID.

2702: The CU transmits an RRC connection establishment message of the UE to the RN 1. This may specifically include the following steps.

(1) The CU sends, to the DU, an F1AP message encapsulated with the RRC connection establishment message. The RRC connection establishment message may be encapsulated in an RRC message container of the F1AP message, and a type of the F1AP message encapsulated with the RRC connection establishment message may be a downlink RRC transfer message. The F1AP message encapsulated with the RRC connection establishment message carries a first connection identifier (that is, a CU UE F1AP ID) allocated by the CU, and may further carry the first connection identifier, that is, the DU UE F1AP ID, allocated by the DU to the UE.

(2) After receiving the F1AP message that is encapsulated with the RRC connection establishment message and that is sent by the CU, and before sending the RRC connection establishment message of the UE to the RN 1, the DU allocates the first connection identifier (that is, the DU UE F1AP ID) to the UE and replaces the CU UE F1AP ID in the F1AP message with the DU UE F1AP ID, and may further replace the DU UE F1AP ID in the F1AP message with the RN 1 UE F1AP ID. Optionally, the DU stores a correspondence between the CU UE F1AP ID and the DU UE F1AP ID.

Then, on an F1 interface between the CU and the DU, the UE is identified by using the CU UE F1AP ID and the DU UE F1AP ID; on an F1 interface between the DU and the RN 1, the UE is identified by using the DU UE F1AP ID and the RN 1 UE F1AP ID.

Any step in step 2703 to step 2708 may be understood with reference to corresponding steps in step 2103 to step 2108 in Embodiment 2 of Embodiment 1. It should be noted that an F1AP message between the RN 1 and the CU is first sent to the DU, and then the DU sends the F1AP message to a destination node (the RN 1 or the CU). The DU may not change content in the F1AP message other than the CU UE F1AP ID or the RN 1 UE F1AP ID. Optionally, the DU may further change a transport address.

2709: The CU configures a context of the UE for the RN 1 by using an F1AP message. This may specifically include the following steps.

(1) The CU configures the context of the UE for the DU by using the F1AP message, and the DU first receives the F1AP message that is encapsulated with context information of the UE and that is sent by the CU.

Content of the context information of the UE may be understood with reference to the description of step 2109 in Embodiment 2 of Embodiment I. The tunnel endpoint identifier is an endpoint identifier of a GTP tunnel corresponding to a UE DRB on the CU in this embodiment of this application, that is, an uplink endpoint identifier of the GTP tunnel on the CU; the RB of the RN 1 corresponds to a radio bearer between the RN 1 and the RN 2 in this application.

(2) The DU allocates, to the GTP tunnel corresponding to the UE DRB that needs to be established, a UL TEID (denoted as a DU UL TEID) on the DU that is in a one-to-one correspondence with the GTP tunnel, and the DU maintains a mapping relationship between a CU UL TEID and the DU UL TEID, and sends the DU UL TEID through an F1AP message that includes UE context configuration information to the RN 1.

2710: The RN 1 sends a UE context setup completion message to the CU. This may specifically include the following steps.

(1) The RN 1 sends, to the DU, an F1AP message encapsulated with UE context setup completion information, and the F1AP message may further include a list of RBs that have been established by the RN 1 and an endpoint identifier of the GTP tunnel corresponding to the UE DRB on the RN 1. The endpoint identifier is denoted as an RN 1 DL TEID, to be specific, a downlink endpoint identifier of a GTP tunnel per UE DRB (a GTP tunnel in a one-to-one correspondence with the UE DRB).

(2) After receiving the F1AP message sent by the RN 1, the DU allocates, to a GTP tunnel of the UE at an F1 connection, a DL TEID (denoted as a DU DL TEID) on the DU corresponding to the GTP tunnel, the DU maintains a mapping relationship between the RN 1 DL TEID and the DU DL TEID, and then the DU returns an F1AP message including the DU DL TEID and to the CU.

2711: The CU configures the RN 2. This may specifically include: sending, by the CU, configuration information (for example, an RRC reconfiguration message, or an F1AP message sent to the RN 2) to the RN 2 via the DU, where the configuration information includes context information of the UE, and information about a bearer (to be specific, an identifier of a radio bearer between the RN 2 and the DU, a QoS parameter corresponding to the radio bearer, and the like) that needs to be established by the RN 2. If the configuration information is the RRC reconfiguration message, the RRC reconfiguration message generated by the CU for the RN 2 may be carried in the F1AP message in 2709 (1) and sent by the CU to the DU, or may be carried in another F1AP message sent by the CU to the DU in this step.

After step 2711, the RN 2 may further feed back a configuration completion message, for example, an RRC reconfiguration completion message or an F1AP message, to the CU via the DU. This is specifically determined based on a type of a message sent by the CU to the RN 2 in step 2711. In other words, in step 2711, when the CU sends the RRC reconfiguration message to the RN 2, the RN 2 feeds back the RRC reconfiguration completion message to the CU. When the CU sends the F1AP message to the RN 2, the RN 2 feeds back the F1AP message to the CU.

2712: The CU generates an RRC reconfiguration message of the UE, encapsulates the RRC reconfiguration message into an F1AP message whose type is downlink RRC transmission, and sends the F1AP message to the RN 1 via the DU. For content of the RRC reconfiguration message, refer to the description in step 2111 for understanding.

For 2713 and 2714, respectively refer to step 2112 and step 2113 in Embodiment 2 of Embodiment I for understanding. Details are not described herein again.

2715: The RN 1 transmits, to the CU via the DU, an F1AP message encapsulated with the RRC reconfiguration completion message of the UE.

For 2716, refer to step 2115 in Embodiment 2 of Embodiment I for understanding. Details are not described herein again.

In Embodiment 1 and Embodiment 2 of Embodiment IV, the DU serves as an agent node of the F1 connection between the RN 1 and the CU, and the DU further needs to perform the following actions.

(1) The DU, as a role of an F1AP agent, allocates the first connection identifier, denoted as the DU UE F1AP ID, to the UE. The DU may read an F1AP message transmitted through the DU, and determine, based on message type information in the F1AP message, whether to modify an F1 connection identifier of the UE that is carried in the message. For example, when the message type information is displayed as a UE-related message such as a message related to UE context setup/modification release, an RRC transfer message of the UE. F1 connection reset, an F1 connection reset acknowledgment, or an error indication, the DU may replace an identifier of the UE. The replacement may be: If UE identifiers carried in a downlink F1AP message received by the DU are the CU UE F1AP ID and the DU UE F1AP ID, the DU replaces the CU UE F1AP ID (an F1 connection identifier allocated by the CU to the UE) in the downlink F1AP message sent by the CU to the RN 1 with the RN 1 UE F1AP ID (an F1 connection identifier allocated by the RN 1 to the UE). If UE identifiers carried in an uplink F1AP message received by the DU is the DU UE F1AP ID and the RN 1 UE F1AP ID, the RN 1 UE F1AP ID in the uplink F1AP message sent by the RN 1 to the CU may be further replaced with the CU UE F1AP ID. In other words, UE identifiers carried in an F1AP message transmitted between the DU and the CU are the CU UE F1AP ID and the DU UE F1AP ID, and UE identifiers carried in an F1AP message transmitted between the DU and the RN 1 are the DU UE F1AP ID and the RN 1 UE F1AP ID. Alternatively, the replacement may be: If UE identifiers carried in an uplink F1AP message received by the DU are the DU UE F1AP ID and the RN 1 UE F1AP ID, before the uplink F1AP message is forwarded, the DU replaces the two UE identifiers carried in the received uplink F1AP message, to be specific, respectively replaces the DU UE F1AP ID and the RN 1 UE F1AP ID with the CU UE F1AP ID and the DU UE F1AP ID, and then sends the uplink F1AP message to the CU. If UE identifiers carried in a downlink F1AP message received by the DU are the CU UE F1AP ID and the DU UE F1AP ID, before the downlink F1AP message is forwarded, the DU replaces the two UE identifiers carried in the received downlink F1AP message, to be specific, respectively replaces the CU UE F1AP ID and the DU UE F1AP ID with the DU UE F1AP ID and the RN 1 UE F1AP ID, and then sends the downlink F1AP message to the RN 1. Alternatively, the replacement may be: Before the DU forwards an uplink F1AP message, if UE identifiers carried in the message are the CU UE F1AP ID and the RN 1 UE F1APID, the DU may not perform replacement, or replace the RN 1 UE F1AP ID in the received uplink F1AP message with the DU UE F1AP ID and then send the message to the CU. Before a downlink F1AP message is forwarded, if UE identifiers carried in the message are the CU UE F1AP ID and the RN 1 UE F1AP ID, the DU may not perform replacement, or replace the CU UE F1AP ID in the F1AP message with the DU UE F1AP ID.

(2) When receiving, from the CU, the UL TEID (denoted as the CU UL TEID) configured by the CU for the GTP tunnel of the UE at the F1 connection, the DU may allocate a UL TEID (denoted as a DU UL TEID) on the DU that is in a one-to-one correspondence with the UL TEID, and the DU maintains a mapping relationship between the CU UL TEID and the DU UL TEID, and sends an F1AP message including the DU UL TEID to the RN 1.

When receiving, from the RN 1, the DL TEID (denoted as the RN 1 DL TEID) configured by the RN 1 for the GTP tunnel of the UE at the F1 connection, the DU may allocate a DL TEID (denoted as a DU DL TEID) on the DU that is in a one-to-one correspondence with the DL TEID, and the DU maintains a mapping relationship between the RN 1 DL TEID and the DU DL TEID, and returns an F1AP message including the DU DL TEID to the CU.

The DU UL TEID and the DU DL TEID that are allocated by the DU may be a same tunnel endpoint identifier, or may be different tunnel endpoint identifiers.

In this case, before sending uplink user plane data packet of the UE to the CU, the DU replaces an uplink tunnel endpoint identifier DU UL TEID in the uplink user plane data packet with the CU UL TEID allocated by the CU to the UE. Before sending downlink user plane data packet of the UE to the RN 1, the DU replaces a downlink tunnel endpoint identifier DU DL TEID in the downlink user plane data packet with the RN 1 DL TEID allocated by the RN 1 to the UE.

In this embodiment, the DU is used as an agent node of the F1 connection, so that a protocol layer architecture and a communication manner between a DU and a CU in the prior art can be avoided. An intermediate RN does not need to parse an end-to-end F1AP message, and only needs to perform routing and forwarding. By using the technical solution in this embodiment, a single-hop scenario (only an intermediate node needs to be removed) is easily extended, and flexible adaptation is performed when a topology changes, so that unnecessary configuration update can be reduced.

Embodiment V

This embodiment is based on the control-plane protocol layer architecture shown in FIG. 18, and an RN 2 needs to function as an agent of an F1 connection between a DgNB and an RN 1.

Embodiment 1

Figure 28:
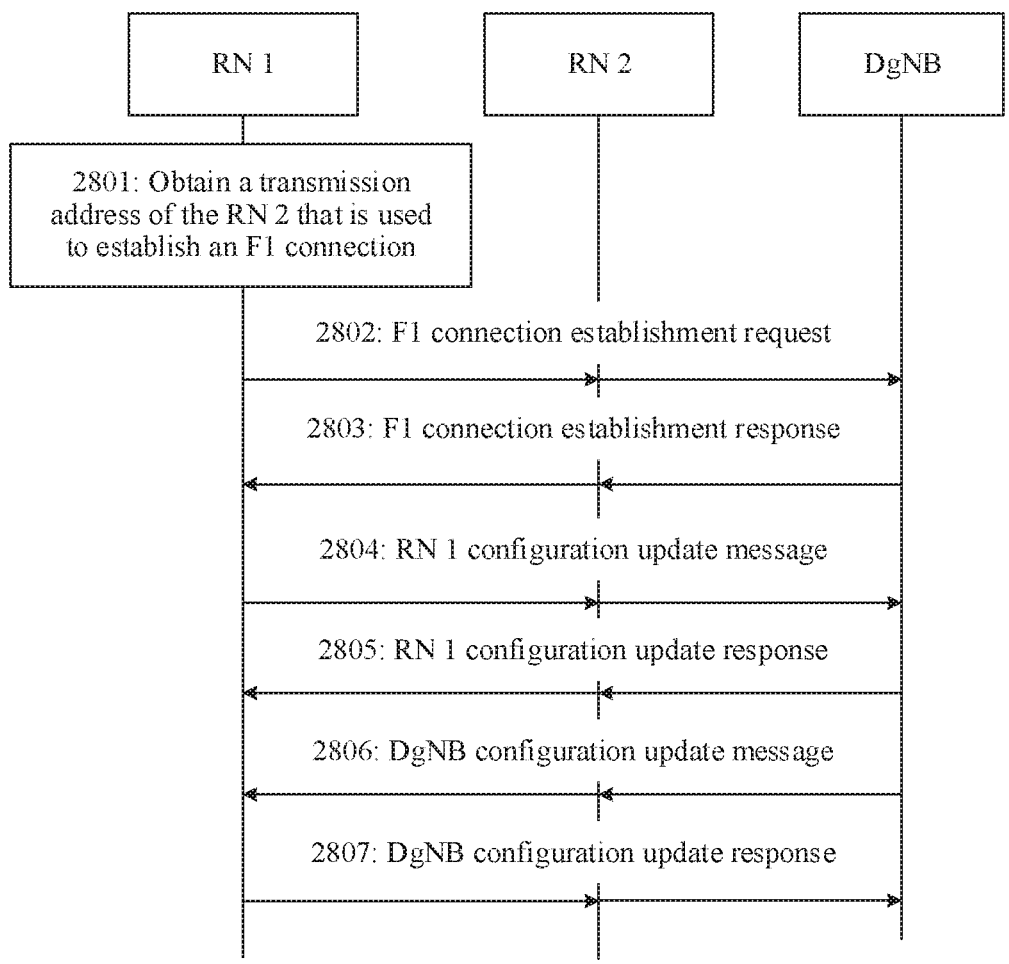
FIG. 28 is a schematic diagram of another F1 connection establishment process according to an embodiment of this application.

When the RN 2 is used as an agent of the F1 connection between the RN 1 and the DgNB, the F1 connection between the RN 1 and the DgNB is divided into two segments, to be specific, a first segment between the RN 1 and the RN 2 and a second segment between the RN 2 and the DgNB. Therefore, as shown in FIG. 28, the method may include step 2801 to step 2807.

A difference between step 2801 and step 2001 lies in that a transport address obtained by the RN 1 is a transport address of the RN 2, to establish the first segment of the F1 connection. Therefore, the RN 1 may obtain transport addresses/a transport address of the DgNB and/or the RN 2 by using OAM configuration information. Alternatively, the RN 1 obtains transport addresses/a transport address of the DgNB and/or the RN 2 by using RRC configuration information sent by the DgNB. Alternatively, the RN 1 obtains a transport address of the DgNB by using OAM configuration information, and obtains the transport address of the RN 2 by using RRC configuration information sent by the DgNB.

It should be noted that before step 2601, an F1 connection is established between the RN 2 and the DgNB.

A difference between step 2602 and step 2002 lies in that the RN 1 first sends an F1 connection establishment request to the RN 2, and then the RN 2 generates an F1AP message and sends some or all information in the F1 connection request to the DgNB. Optionally, the RN 2 may not change content of the F1AP message that is received by the RN 2 and that is sent by the RN 1 to the DgNB but directly send the F1AP message to the DgNB. For example, the RN 2 may read the content of the F1AP message received by the RN 2 from the RN 1. It is determined based on a message type (for example, a message unrelated to UE, such as an F1 connection establishment request, an RN 1 configuration update, and a DgNB configuration update acknowledgment or failure) in the F1AP message, that message content does not need to be changed, and the received F1AP message is directly sent to the DgNB.

The F1 connection request includes at least one of the following information: an RN 1 ID, an RN 1 name, RN 1 system information, RN 1 cell information, and the like.

A difference between step 2603 and step 2003 lies in that the DgNB first sends an F1 connection establishment response to the RN 2, and then the RN 2 generates the F1AP message and sends the F1AP message to the RN 1. Optionally, the RN 2 may not change content of the F1AP message that is sent by the DgNB and that is received by the RN 2 but directly send the F1AP message to the RN 1. For example, the RN 2 may read the content of the F1AP message that is received by the RN 2 from the DgNB and that is sent to the RN 1. It is determined based on message type information (for example, when the message type information is displayed as a message unrelated to UE, such as an F1 connection establishment response message, a DgNB configuration update, and an RN configuration update acknowledgment or failure) in the F1AP message, that message content does not need to be changed, and the received F1AP message is directly sent to the RN 1.

The F1AP message includes some or all information in the F1 connection establishment response message sent by the DgNB, for example, information (an NCGI and/or a PCI) about a cell served by the RN 1 to be activated.

A difference between any step in step 2804 to step 2807 and a corresponding step in step 2004 to step 2007 lies in that, in a process of updating an RN 1 configuration and updating a DgNB configuration, the RN 2 also forwards a corresponding F1AP message between the RN 1 and the DgNB.

Embodiment 2

Figure 29:
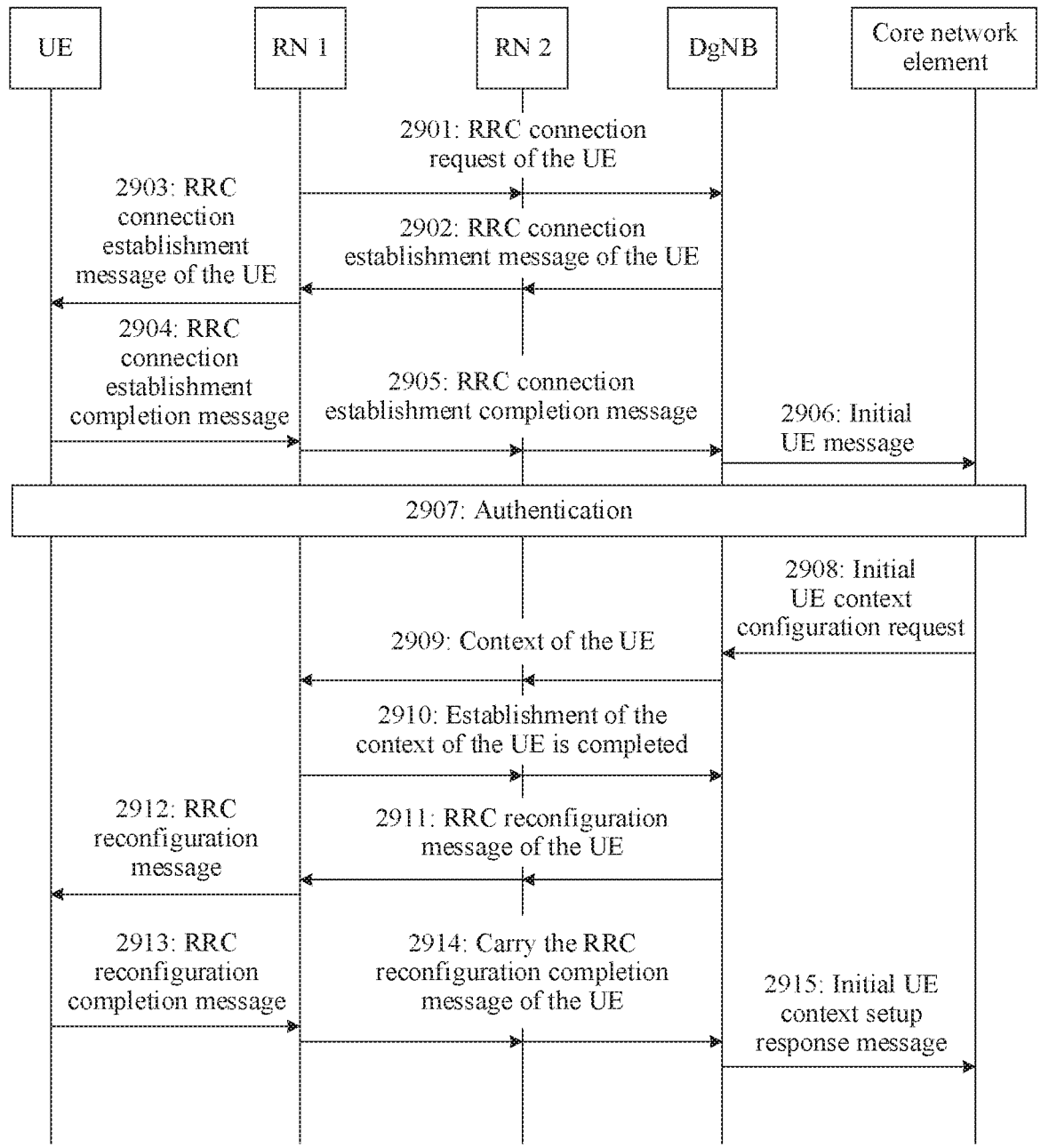
FIG. 29 is a schematic diagram of another process of attaching UE to a network according to an embodiment of this application.

In the control-plane protocol layer architecture shown in FIG. 18, for an attach procedure of UE served by the RN 1, refer to the procedure in Embodiment 2 of Embodiment I. Because a function of an RN 2 in this embodiment is similar to a function of the DU in FIG. 17, for the attach procedure of the UE served by the RN 1, refer to the procedure in Embodiment 2 of Embodiment IV. As shown in FIG. 29, the RN 2 network element in FIG. 27 is removed, the DU is replaced with the RN 2 in this embodiment, the CU is replaced with the DgNB in this embodiment, and the attach procedure of the UE served by the RN 1 in this embodiment may be obtained by deleting step 2711. FIG. 29 includes step 2901 to step 2915, any step in step 2901 to step 2910 may be understood with reference to corresponding steps in step 2701 to step 2710, and any step in step 2911 to step 2915 may be understood with reference to corresponding steps in step 2712 to step 2716. During understanding by reference, a node in a step corresponding to FIG. 27 may be replaced in the foregoing replacement manner (to be specific, the DU in FIG. 27 is replaced with the RN 2 in FIG. 29 in this embodiment, and the CU in FIG. 27 is replaced with the DgNB in FIG. 29 in this embodiment).

In Embodiment 2 of Embodiment V, the RN 2 serves as an agent node of the F1 connection between the RN 1 and the DgNB, and further needs to perform the following actions.

(1) The RN 2, as a role of an F1AP agent, allocates a first connection identifier, denoted as an RN 2 UE F1AP ID, to the UE. The RN 2 may read an F1AP message transmitted through the RN 2, and determine, based on message type information in the F1AP message, whether to modify an F1 connection identifier of the UE that is carried in the message. For example, when the message type information is displayed as a UE-related message such as a message related to UE context setup/modification/release, an RRC transfer message of the UE, F1 connection reset, an F1 connection reset acknowledgment, or an error indication, the RN 2 may replace an identifier of the UE. The replacement may be: If UE identifiers carried in a downlink F1AP message received by the RN 2 are a DgNB UE F1AP ID and the RN 2 UE F1AP ID, the RN 2 replaces the DgNB UE F1AP ID (an F1 connection identifier allocated by the DgNB to the UE) in the downlink F1AP message sent by the DgNB to the RN 1 with an RN 1 UE F1AP ID (an F1 connection identifier allocated by the RN 1 to the UE). If UE identifiers carried in an uplink F1AP message received by the RN 2 is the RN 2 UE F1AP ID and the RN 1 UE F1AP ID, the RN 1 UE F1AP ID in the uplink F1AP message sent by the RN 1 to the DgNB may be further replaced with the DgNB UE F1AP ID. In other words, UE identifiers carried in an F1AP message transmitted between the RN 2 and the DgNB are the DgNB UE F1AP ID and the RN 2 UE F1AP ID, and UE identifiers carried in an F1AP message transmitted between the RN 2 and the RN 1 are the RN 2 UE F1AP ID and the RN 1 UE F1AP ID. Alternatively, the replacement may be: If UE identifiers carried in an uplink F1AP message received by the RN 2 are the RN 2 UE F1AP ID and the RN 1 UE F1AP ID, before the uplink F1AP message is forwarded, the RN 2 replaces the two UE identifiers carried in the received uplink F1 AP message, to be specific, respectively replaces the RN 2 UE F1AP ID and the RN 1 UE F1AP ID with the DgNB UE F1AP ID and the RN 2 UE F1AP ID, and then sends the uplink F1AP message to the DgNB. If UE identifiers carried in a downlink F1AP message received by the RN 2 are the DgNB UE F1AP ID and the RN 2 UE F1AP ID, before the downlink F1AP message is forwarded, the RN 2 replaces the two UE identifiers carried in the received downlink F1AP message, to be specific, respectively replaces the DgNB UE F1AP ID and the RN 2 UE F1AP ID with the RN 2 UE F1AP ID and the RN 1 UE F1AP ID, and then sends the downlink F1AP message to the RN 1. Alternatively, the replacement may be: Before the RN 2 forwards an uplink F1AP message, if UE identifiers carried in the message are the DgNB UE F1AP ID and the RN 1 UE F1AP ID, the RN 2 may not perform replacement, or replace the RN 1 UE F1AP ID in the received uplink F1AP message with the RN 2 UE F1AP ID and then send the message to the DgNB. Before a downlink F1AP message is forwarded, if UE identifiers carried in the message are the DgNB UE F1AP ID and the RN 1 UE F1AP ID, the RN 2 may not perform replacement, or replace the DgNB UE F1AP ID in the F1AP message with the RN 2 UE F1AP ID.

(2) When receiving, from the DgNB, a UL TEID (denoted as a DgNB UL TEID) configured by the DgNB for a GTP tunnel of the UE at the F1 connection, the RN 2 may allocate a UL TEID (denoted as an RN 2 UL TEID) on the RN 2 that is in a one-to-one correspondence with the UL TEID, and the RN 2 maintains a mapping relationship between the DgNB UL TEID and the RN 2 UL TEID, and sends an F1AP message including the RN 2 UL TEID to the RN 1.

(2) When receiving, from the RN 1, a DL TEID (denoted as an RN 1 DL TEID) configured by the RN 1 for the GTP tunnel of the UE at the F1 connection, the RN 2 may allocate a DL TEID (denoted as an RN 2 DL TEID) on the RN 2 that is in a one-to-one correspondence with the DL TEID, and the RN 2 maintains a mapping relationship between the RN 1 DL TED and the RN 2 DL TEID, and sends an F1AP message including the RN 2 DL TEID to the DgNB.

The RN 2 UL TEID and the RN 2 DL TEID that are allocated by the RN 2 may be a same tunnel endpoint identifier, or may be different tunnel endpoint identifiers.

In this case, before sending uplink user plane data packet of the UE to the DgNB, the RN 2 replaces an uplink tunnel endpoint identifier RN 2 UL TEID in the uplink user plane data packet with the DgNB UL TEID allocated by the DgNB to the UE. Before sending downlink user plane data packet of the UE to the RN 1, the RN 2 replaces a downlink tunnel endpoint identifier RN 2 DL TEID in the downlink user plane data packet with the RN 1 DL TEID allocated by the RN 1 to the UE, so that the DgNB and the RN 1 identify a terminal corresponding to the user plane data packet.

In this embodiment, a multi-hop RN networking scenario of a hop-by-hop F1 connection, a procedure of establishing the F1 connection between the RN and the DgNB, and a procedure of accessing a network by the UE via the RN are designed. A design related to an F1 interface in a CU-DU in the prior art may be used as much as possible, and the F1-AP message is used to manage an RN cell, configure the UE context, and send a UR RRC message. An intermediate RN node involved in this embodiment, as a role of an agent node of the F1 connection, may parse the F1AP message. Therefore, the intermediate RN and/or DU node that serves as an agent node may directly obtain the configuration information related to the UE by using the F1 interface message sent to the RN serving the UE, and no additional configuration information is required, thereby reducing signaling overheads.

If the DgNB in this embodiment is in a form in which a CU and a DU are separated, the DU may be understood with reference to a function of the DU in Embodiment IV, to be specific, both the DU and the RN 2 may serve as agent roles of the F1 connection, forward the F1AP message between the RN 2 and the CU, and replace the F1 connection identifier of the UE.

The control-plane protocol layer and method provided in the embodiments of this application may be applied to wireless relay networks of a plurality of standards (for example, standards such as 4G, 5G, WiMAX, and WiFi). In addition, the F1 connection in the embodiments of this application is a management plane connection between the first node and the second node, or a management plane connection between the DgNB (or a DgNB-CU) and the RN, and may also be referred to as another connection or interface.

The terminal in the embodiments of this application may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. Alternatively, the terminal may be a station (ST) in a wireless local area network (WLAN), and may be a cellular phone, a cordless phone, a session initiation protocol (SIP) phone, a wireless local loop (WLL) station, a personal digital assistant (PDA) device, a handheld device having a wireless communication function, a computing device, or another processing device connected to a wireless modem, a vehicle-mounted device, or a wearable device (which may also be referred to as a wearable intelligent device). Alternatively, the terminal may be a terminal in a next generation communications system, for example, a terminal in 5G or a terminal in a future evolved public land mobile network (PLMN), or a terminal in a new radio (NR) communications system.

The method provided in the embodiments of this application may be further applied to a home broadband access scenario. The RN may alternatively be a device such as customer premises equipment (CPE), or a home gateway (RG). In the embodiments of this application, L2 and L1 may be wired connections based on a technology such as the Ethernet/a point-to-point protocol (PPP)/Ethernet-based point to point (PPPoE)/an asynchronous transfer mode (ATM), or a connection between a link layer and a physical layer based on a technology such as WLAN/Bluetooth/Zigbee.

The control-plane protocol layer and the method provided in the embodiments of this application may be applied to wireless relay networks of a plurality of standards (for example, standards such as 4G, 5G, worldwide interoperability for microwave access (WiMAX), and wireless-fidelity (WiFi)). In addition, the F1 connection in the embodiments of this application is a management plane connection between the first node and the second node, or a management plane connection between the DgNB (or a DgNB-CU) and the RN, and may also be referred to as another connection or interface.

FIG. 4 shows a network node. The shown structure of the network node may be a schematic composition diagram of the first node or the second node.

When FIG. 4 is the schematic composition diagram of the first node, the processor 401 is configured to control and manage an action of the first node, and is configured to perform a processing process performed by the first node in the foregoing embodiments of this application. For example, the processor 401 is configured to support the first node in performing a process 1901 in FIG. 19 and/or an action performed by the first node in another process described in the embodiments of this application.

When FIG. 4 is the schematic composition diagram of the second node, the processor 401 is configured to control and manage an action of the second node, and is configured to perform a processing process performed by the second node in the foregoing embodiments of this application. For example, the processor 401 is configured to support the second node in performing a process 1902 in FIG. 19 and/or an action performed by the second node in another process described in the embodiments of this application.

An embodiment of this application further provides a computer-readable storage medium, including an instruction. When the instruction is run on a computer, the computer is enabled to perform any method described in the foregoing embodiments.

An embodiment of this application further provides a computer program product including an instruction. When the computer program product is run on a computer, the computer is enabled to perform any method described in the foregoing embodiments.

All or some of the embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium that can be accessed by a computer, or may be a data storage device such as a server or a data center integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of a plurality. A single processor or another unit may implement several functions listed in the claims. Some measures are described in dependent claims that are different from each other, but this does not mean that these measures cannot be combined to produce a better effect.

Although this application is described with reference to specific features and the embodiments thereof, it is apparent that various modifications and combinations may be made to them without departing from the spirit and scope of this application. Correspondingly, the specification and accompanying drawings are merely examples for description of this application defined by the appended claims, and are considered as any or all of modifications, variations, combinations, or equivalents that cover the scope of this application. Apparently, a person skilled in the art can make various modifications and variations to this application without departing from the spirit and scope of this application. This application is intended to cover these modifications and variations of this application provided that they fall within the scope of the following claims and their equivalent technologies.

What is claimed is:
1. A donor base station in a 3GPP system, comprising:
at least one processor; and a memory coupled to the at least one processor and storing programming instructions for execution by the at least one processor to perform operations comprising:
  establishing a F1 application protocol (F1AP) layer of the donor base station, wherein the F1AP layer of the donor base station and a F1AP layer of a relay node are peer F1AP layers;
  sending, based on performing a function of a control-plane protocol layer, a F1AP message from the F1AP layer of the donor base station to the F1AP layer of the relay node, wherein the control-plane protocol layer comprises, from top to bottom, the F1AP layer of the donor base station, a second protocol layer of the donor base station having a peer second protocol layer of a network node, a radio link control (RLC) layer having a peer RLC layer of the network node, a media access control (MAC) layer having a peer MAC layer of the network node, and a physical (PHY) layer having a peer PHY layer of the network node, and wherein the F1AP message comprises one or more of context management information of a terminal device served by the relay node or a radio resource control (RRC) message of the terminal device;
  adding, at the second protocol layer of the donor base station, routing information for the F1AP message;
  sending, from the second protocol layer of the donor base station to a peer second protocol layer of the network node, the F1AP message and the routing information; and
  determining, at the second protocol layer, at least one of a radio bearer (RB), a logical channel, an RLC channel, or an RLC bearer on which the F1AP message is sent.

2. A relay node in a 3GPP system, comprising:
at least one processor; and
a memory coupled to the at least one processor and storing programming instructions for execution by the at least one processor to perform operations comprising:
  receiving a F1 application protocol (F1AP) message at a F1AP layer of a control-plane protocol layer of a relay node from a F1AP layer of a donor base station, wherein the F1AP layer of the relay node and the F1AP layer of the donor base station are peer F1AP layers, wherein the F1AP message comprises one or more of context management information of a terminal device served by the relay node or a radio resource control (RRC) message of the terminal device, wherein the control-plane protocol layer comprises, from top to bottom, the F1AP layer of the donor base station, a second protocol layer of the donor base station having a peer second protocol layer of a network node, a radio link control (RLC) layer having a peer RLC layer of the network node, a media access control (MAC) layer having a peer MAC layer of the network node, and a physical (PHY) layer having a peer PHY layer of the network node, and wherein
  the second protocol layer of the relay node is configured to:
    receive, from the second protocol layer of the network node, the first message and routing information for the F1AP message added by the peer second protocol layer of the network node;
    obtain the routing information of the first message; and
    route the F1AP message based on the routing information of the F1AP message.

3. A 3GPP communications system, comprising a donor base station and a relay node; wherein
the donor base station comprises:
  at least one processor; and
  a memory coupled to the at least one processor and storing programming instructions for execution by the at least one processor to perform operations comprising:
    establishing a F1 application protocol (F1AP) layer of the donor base station, wherein the F1AP layer of the donor base station and a F1AP layer of a relay node are peer F1AP layers;
    sending, based on performing a function of a control-plane protocol layer, a F1AP message from the F1AP layer of the donor base station to the F1AP layer of the relay node, wherein the control-plane protocol layer comprises, from top to bottom, the F1AP layer of the donor base station, a second protocol layer of the donor base station having a peer second protocol layer of a network node, a radio link control (RLC) layer having a peer RLC layer of the network node, a media access control (MAC) layer having a peer MAC layer of the network node, and a physical (PHY) layer having a peer PHY layer of the network node, and wherein the F1AP message comprises one or more of context management information of a terminal device served by the relay node or a radio resource control (RRC) message of the terminal device;
    adding, at the second protocol layer of the donor base station, routing information for the F1AP message;
    sending, from the second protocol layer of the donor base station to a peer second protocol layer of the network node, the F1AP message and the routing information; and
    determining, at the second protocol layer, at least one of a radio bearer (RB), a logical channel, an RLC channel, or an RLC bearer on which the F1AP message is sent; and
the relay node comprises:
  at least one processor; and
  a memory coupled to the at least one processor and storing programming instructions for execution by the at least one processor to perform operations comprising:
    receiving the F1AP message at the F1AP layer of the relay node from the F1AP layer of the donor base station.

* * * * *